(12) United States Patent
Van Der Auwera et al.

(10) Patent No.: US 10,848,761 B2
(45) Date of Patent: Nov. 24, 2020

(54) REDUCING SEAM ARTIFACTS IN 360-DEGREE VIDEO

(71) Applicant: Qualcomm Incorporated, San Diego, CA (US)

(72) Inventors: Geert Van Der Auwera, Del Mar, CA (US); Muhammed Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 16/020,374

(22) Filed: Jun. 27, 2018

(65) Prior Publication Data

US 2019/0005683 A1    Jan. 3, 2019

Related U.S. Application Data

(60) Provisional application No. 62/526,700, filed on Jun. 29, 2017.

(51) Int. Cl.
*H04N 19/119*    (2014.01)
*H04N 19/124*    (2014.01)
(Continued)

(52) U.S. Cl.
CPC ......... *H04N 19/124* (2014.11); *G06T 3/0037* (2013.01); *G06T 9/00* (2013.01);
(Continued)

(58) Field of Classification Search
CPC .. H04N 19/124; H04N 19/119; H04N 19/122; H04N 19/13; H04N 19/159; H04N 19/172; H04N 19/176
See application file for complete search history.

(56) References Cited

U.S. PATENT DOCUMENTS 6,693,649 B1    2/2004    Lipscomb et al.
9,098,746 B2    8/2015    Huang et al.
(Continued)

OTHER PUBLICATIONS

Akula S.N., et al., "AHG8: Efficient Frame Packing for Icosahedral Projection," 5. JVET Meeting; Dec. 1, 2017-Jan. 20, 2017; Geneva; (The Joint Video Exploration Team of ISO/IEC JTC1/SC29/WG11 and ITU-T SG.16); URL: http://phenix.int-evry.fr/jvet/ , No. JVET-E0029-v4, Jan. 13, 2017, XP030150493, 5 pages.

(Continued)

*Primary Examiner* — Jonathan R Messmore
(74) *Attorney, Agent, or Firm* — QUALCOMM Incorporated

(57) ABSTRACT

Provided are systems and methods for processing 360-degree video data by obtaining a 360-degree rectangular formatted projected picture, where the 360-degree rectangular formatted projected picture includes at least a first region, the at least first region includes at least one region boundary, and the at least first region includes a first region area; determining at least one guard band area located within the first region area, where the at least one guard band area is located alongside the at least one region boundary, and the first region area further includes a projected region area located outside the at least one guard band area; and coding a current coding block in the at least one guard band area using at least one additional guard band sample.

39 Claims, 15 Drawing Sheets

(51) Int. Cl.

| | | |
|---|---|---|
| *G06T 9/00* | (2006.01) | |
| *H04N 19/55* | (2014.01) | |
| *H04N 19/597* | (2014.01) | |
| *G06T 3/00* | (2006.01) | |
| *G06T 9/40* | (2006.01) | |
| *H04L 1/00* | (2006.01) | |
| *H04N 19/122* | (2014.01) | |
| *H04N 19/13* | (2014.01) | |
| *H04N 19/159* | (2014.01) | |
| *H04N 19/172* | (2014.01) | |
| *H04N 19/176* | (2014.01) | |
| *H04N 19/82* | (2014.01) | |
| *G06T 17/10* | (2006.01) | |

(52) U.S. Cl.
CPC .............. *G06T 9/40* (2013.01); *H04L 1/0011* (2013.01); *H04N 19/119* (2014.11); *H04N 19/122* (2014.11); *H04N 19/13* (2014.11); *H04N 19/159* (2014.11); *H04N 19/172* (2014.11); *H04N 19/176* (2014.11); *H04N 19/55* (2014.11); *H04N 19/597* (2014.11); *H04N 19/82* (2014.11); *G06T 17/10* (2013.01); *G06T 2207/10016* (2013.01)

(56) References Cited

U.S. PATENT DOCUMENTS

| | | |
|---|---|---|
| 2010/0322304 A1 | 12/2010 | Lee et al. |
| 2013/0101031 A1 | 4/2013 | Van Der Auwera et al. |
| 2015/0030068 A1 | 1/2015 | Sato |
| 2015/0373328 A1 | 12/2015 | Yenneti et al. |
| 2016/0094860 A1 | 3/2016 | Minezawa et al. |
| 2017/0085197 A1* | 3/2017 | Hannuksela ......... H04N 19/182 |
| 2017/0302966 A1 | 10/2017 | Xu et al. |
| 2018/0103199 A1 | 4/2018 | Hendry et al. |
| 2018/0242016 A1 | 8/2018 | Lee et al. |
| 2018/0249163 A1* | 8/2018 | Curcio ................. H04N 19/137 |
| 2018/0249164 A1* | 8/2018 | Kim ..................... H04N 19/112 |
| 2019/0007683 A1 | 1/2019 | Van Der Auwera et al. |
| 2019/0007684 A1 | 1/2019 | Van Der Auwera et al. |
| 2019/0349586 A1 | 11/2019 | Zhou et al. |

OTHER PUBLICATIONS

Boyce J., "BoG Report on 360 Video", 4. JVET Meeting; Oct. 15, 2016-Oct. 21, 2016; Chengdu; (The Joint Video Exploration Team of ISO/ IEC JTC1/SC29/WG11 and ITU-T SG.16); URL: http://phenix.int-evry.fr/jvet/, No. JVET-D0188, Oct. 16, 2016 (Oct. 16, 2016), pp. 1-10, XP030150450.
Boyce J., et al., "Padded ERP (PERP) Projection Format", 6. JVET Meeting; Mar. 31, 2017-Jul. 4, 2017; Hobart; (The Joint Video Exploration Team of ISO/IEC JTC1/SC29/WG11 and ITU-T SG.16); URL: http.V/phenix.int-evry.fr/jvet/, No. JVET-F0108-V2, Apr. 6, 2017 (Apr. 6, 2017), pp. 1-3, XP030150790.
Budagavi M., et al., "OMAF: Metadata for Guard Margin at Polygon Boundaries in 360 Degrees Video to Prevent Boundary Artifacts", 116th MPEG Meeting; Oct. 17, 2016-Oct. 21, 2016; Chengdu; (Motion Picture Expert Group or ISO/IEC JTC1/SC29/WG11),,No. m39280, Oct. 12, 2016, XP030067626, 3 pages.
Fu C-M., et al., "Sample Adaptive Offset in the HEVC Standard," IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.
Hannuksela M.M., et al., "OMAF: Guard Band Signaling", 118. MPEG Meeting; Apr. 3, 2017-Apr. 7, 2017; Hobart; (Motion Picture Expert Group or ISO/IEC JTC1/SC29/WG11), No. m40408, Mar. 28, 2017 (Mar. 28, 2017), pp. 1-5, XP030068753.
He Y., et al., "AHG8: Geometry Padding for 360 Video Coding", 4th JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/,,No. JVET-D0075-v3, Oct. 15, 2016, XP030150309, 10 pages.
International Search Report and Written Opinion—PCT/US2018/040133—ISA/EPO—dated Sep. 18, 2018.
Lin H-C., et al., "AHG8: An Alternative Arrangement for Cube Format (Double-Cross Layout)", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, No. JVET-D0105, Oct. 6, 2016 (Oct. 6, 2016), pp. 1-5, XP030150348, Section 4.
Lin H-C., et al., "AHG8: Compact Cube Layout with Tile Partition", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, No. JVET-D0104, Oct. 6, 2016 (Oct. 6, 2016), pp. 1-6, XP030150347.
Misra K., et al., "An Overview of Tiles in HEVC", IEEE Journal of Selected Topics in Signal Processing, vol. 7, No. 6, Dec. 1, 2013 (Dec. 1, 2013), pp. 969-977, XP055257475, ISSN: 1932-4553, DOI: 10.1109/JSTSP.2013.2271451.
Norkin A., et al., "HEVC Deblocking Filter", IEEE Transactions on Circuits and Systems for Video Technology, Dec. 1, 2012 (Dec. 1, 2012), vol. 22, No. 12, pp. 1746-1754, XP011487156.
Oh S., "Projections Under Consideration for ISO/IEC 23090-2 Omnidirectional MediA Format", 118. MPEG Meeting; Apr. 3, 2017-Apr. 7, 2017; Hobart; (Motion Picture Expert Group or ISO/IEC JTC1/SC29/WG11), No. N16828, Apr. 28, 2017 (Apr. 28, 2017), 28 Pages, XP030023494.
"Technologies Under Considerations for ISO/IEC 23000-20 Omnidirectional Media Application Format", 117. MPEG Meeting; Jan. 16, 2017-Jan. 20, 2017; Geneva; (Motion Picture Expert Group or ISO/IEC JTC1/SC29/WG11), No. N16637, Jan. 26, 2017 (Jan. 26, 2017), 50 Pages, XP030023308.
Van Der Auwera G., et al., "AHG8: ACP with Padding for 360-Degree Video", 7. JVET Meeting; Jul. 13, 2017-Jul. 21, 2017; Torino; (The Joint Video Exploration Team of ISO/IEC JTC1/SC29/WG11 and ITU-T SG.16); URL: http://phenix.int-evry.fr/jvet/, No. JVET-G0071-V2, Jul. 15, 2017 (Jul. 15, 2017), pp. 1-11, XP030150862.
Van Der Auwera G., et al., "AHG8: Equatorial Cylindrical Projection for 360-Degree Video", 6th JVET Meeting; Mar. 31, 2017-Apr. 7, 2017; Hobart; (The Joint Video Exploration Team of ISO/IEC JTC1/SC29/WG11 and ITU-T SG.16); URL: http://phenix.int-evry.fr/jvet/ No. JVET-F0026-v2, Apr. 1, 2017, XP030150677, 6 pages.
Ye Y., et al., "Algorithm Descriptions of Projection Format Conversion and Video Quality Metrics in 360Lib", 6. JVET Meeting; Mar. 31, 2017-Apr. 7, 2017; Hobart; (The Joint Video Exploration Team of ISO/IEC JTC1/SC29/WG11 and ITU-T SG.16); URL: http://phenix.int-evry.fr/jvet/, No. JVET-F1003, Apr. 28, 2017 (Apr. 28, 2017), pp. 1-32, XP030150795.
Zakharchenko V., et al., "AHG8: Icosahedral Projection for 360-degree Video Content," 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/ , No. JVET-D0028, Oct. 6, 2016, XP030150252, 5 pages.
Zhang C., et al., "AHG8; Introducing Overlapping Area of Projections for 360-degree Video Content," 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/ , No. JVET-D0035, Oct. 6, 2016, XP030150263, 3 pages.
Zhang C., et al., "OMAF: Applying Overlap to Different Projection Methods for 360-Degree Video", 116. MPEG Meeting; Oct. 17, 2016-Oct. 21, 2016; Chengdu; (Motion Picture Expert Group or ISO/IEC JTC1/SC29/WG11), No. m39543, Oct. 17, 2016 (Oct. 17, 2016), pp. 1-4, XP030067888.

* cited by examiner

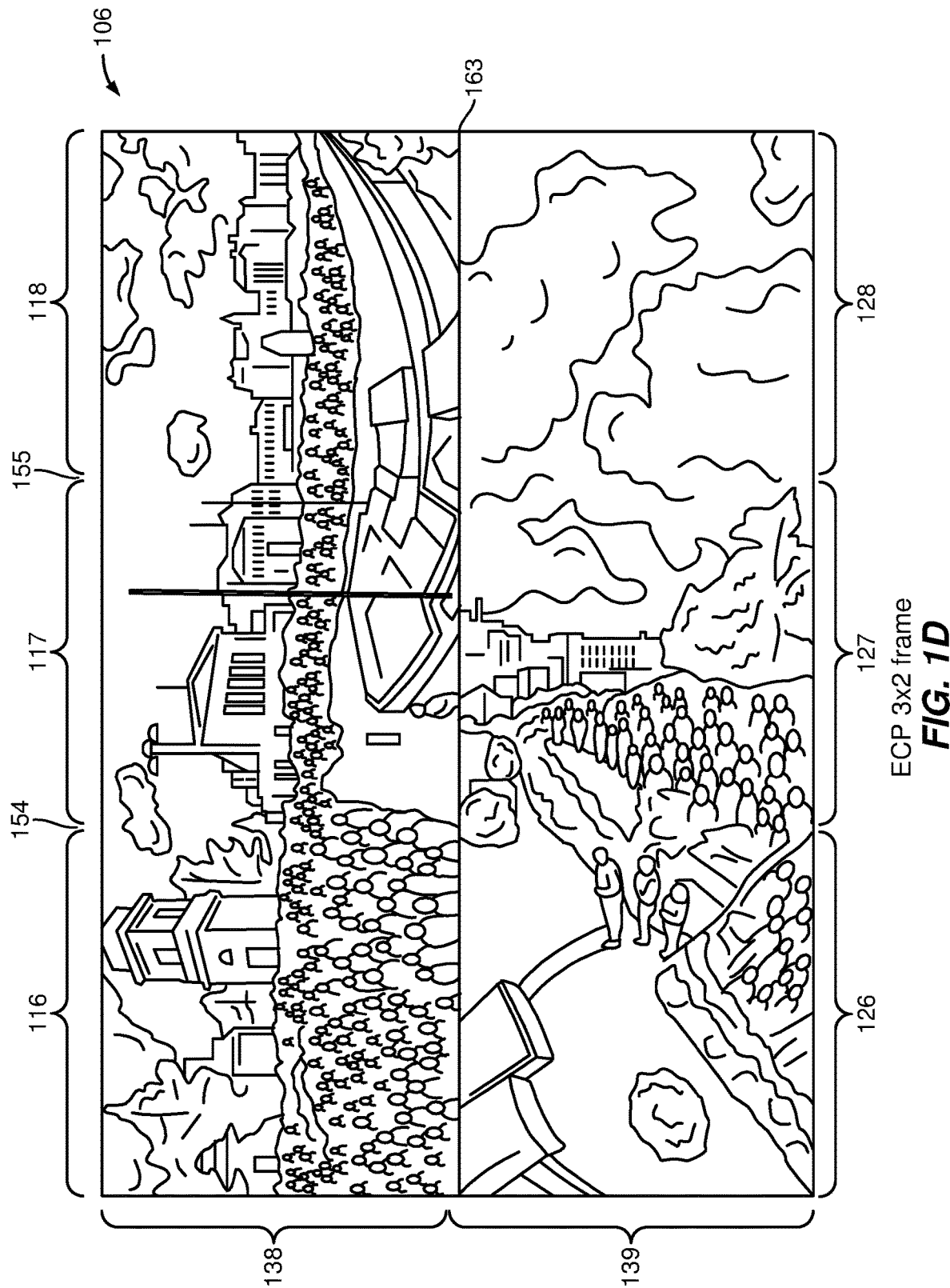
FIG. 1D  ECP 3x2 frame

ERP

CMP, ACP

CMP, ACP

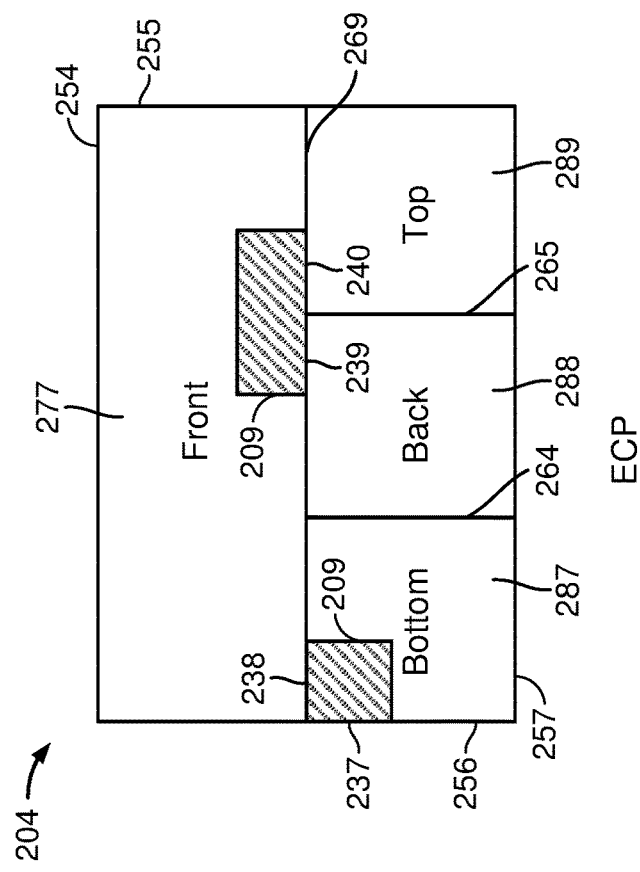
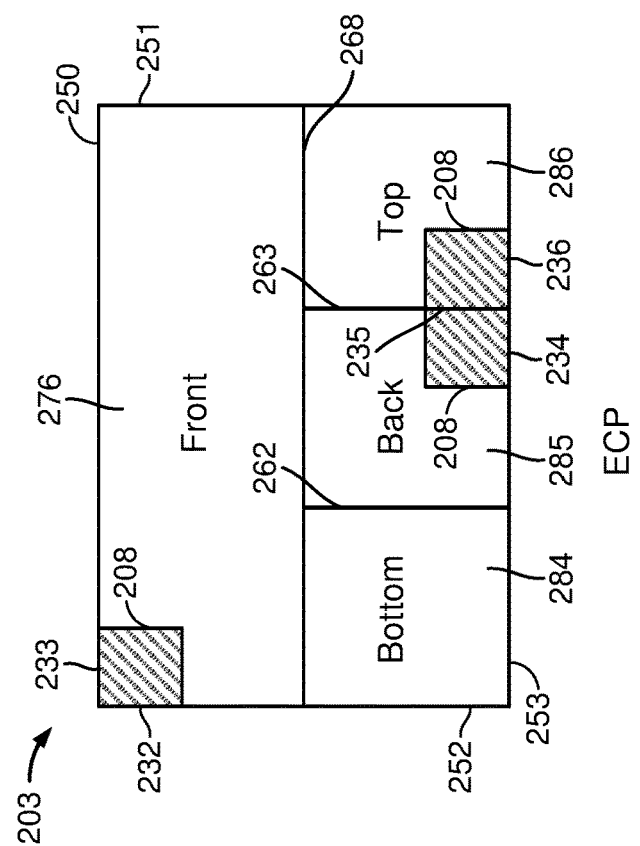
FIG. 2E
FIG. 2D

REDUCING SEAM ARTIFACTS IN 360-DEGREE VIDEO

CLAIM OF PRIORITY UNDER 35 U.S.C. § 119

This application claims the benefit of U.S. Provisional Application No. 62/526,700, filed Jun. 29, 2017, the entire contents of which are hereby incorporated by reference.

FIELD

This application is related to 360-degree video content. For example, systems and methods are described for encoding and/or decoding 360-degree formatted pictures having circular poles of a sphere projected onto square regions, and for efficient and artifact reduced compression and/or decompression of 360 video.

RELATED PATENT APPLICATIONS

This application is related to the following earlier filed applications: application No. 62/473,822 filed Mar. 20, 2017, titled "ADAPTIVE PERTURBED CUBEMAP PROJECTION", application No. 62/479,843 filed Mar. 31, 2017, titled "ADAPTIVE PERTURBED CUBEMAP PROJECTION", application Ser. No. 15/925,674 filed Mar. 19, 2018, titled "ADAPTIVE PERTURBED CUBE MAP PROJECTION", application Ser. No. 15/925,681 filed Mar. 19, 2018, titled "ADAPTIVE PERTURBED CUBE MAP PROJECTION", application No. 62/474,767 filed Mar. 22, 2017, titled "SPHERE POLE PROJECTIONS FOR EFFICIENT COMPRESSION OF 360-DEGREE VIDEO", application No. 62/528,264 filed Jul. 3, 2017, titled "SPHERE POLE PROJECTIONS FOR EFFICIENT COMPRESSION OF 360-DEGREE VIDEO", application Ser. No. 15/926,957 filed Mar. 20, 2018, titled "SPHERE POLE PROJECTIONS FOR EFFICIENT COMPRESSION OF 360-DEGREE VIDEO", application No. 62/475,103 filed Mar. 22, 2017, titled "SPHERE EQUATOR PROJECTION FOR EFFICIENT COMPRESSION OF 360-DEGREE VIDEO", and application Ser. No. 15/926,732 filed Mar. 20, 2018, titled "SPHERE EQUATOR PROJECTION FOR EFFICIENT COMPRESSION OF 360-DEGREE VIDEO". This application hereby incorporates by reference the full contents of each of the above list of earlier filed applications.

BACKGROUND

Video coding standards include Joint Video Exploration Team (JVET) of MPEG and VCEG, ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions.

SUMMARY

In various implementations, methods, devices, apparatus, and computer-readable media for processing 360-degree video data to obtain better coding efficiency are described herein.

A method can include obtaining a 360-degree rectangular formatted projected picture, where the 360-degree rectangular formatted projected picture includes at least a first region, the at least first region includes at least one region boundary, and the at least first region includes a first region area; determining at least one guard band area located within the first region area, where the at least one guard band area is located alongside the at least one region boundary, and the first region area further includes a projected region area located outside the at least one guard band area; and coding a current coding block in the at least one guard band area using at least one additional guard band seam artifact reducing sample.

In some embodiments, the method can include identifying the at least one additional guard band seam artifact reducing sample located within the current coding block.

In further embodiments, the coding the current coding block in the at least one guard band area using the at least one additional guard band seam artifact reducing sample can include: performing a gradient operation that transitions from the at least first region to a second region using the at least one additional guard band seam artifact reducing sample.

In additional embodiments, the coding the current coding block in the at least one guard band area using the at least one additional guard band seam artifact reducing sample can include: performing blending operations using the at least one additional guard band seam artifact reducing sample.

In some implementations, the 360-degree rectangular formatted projected picture can include a second region, and identifying the at least one additional guard band seam artifact reducing sample located within the current coding block can include determining that the at least one additional guard band seam artifact reducing sample is located in the second region.

In further implementations, the guard band seam artifact reducing sample is identified as located in a non-guard band area.

In additional implementations, the 360-degree rectangular formatted projected picture further comprises a second region, wherein the guard band seam artifact reducing sample is a gradient sample that transitions between the first region to the second region.

In some embodiments, determining that the at least one additional guard band seam artifact reducing sample is located in the second region is performed using 3D-to-2D geometric mapping.

In further embodiments, the 3D-to-2D geometric mapping is one of: a cubemap (CMP) process, an adjusted cubemap (ACP) process, and an equatorial cylindrical (ECP) process.

In additional embodiments, the method can include applying interpolation filters across both the current coding block and the at least one additional guard band seam artifact reducing sample.

In some implementations, performing motion estimation using the at least one additional guard band seam artifact reducing sample.

In further implementations, the at least one additional guard band seam artifact reducing sample is a duplicate sample from the projected region area.

In additional implementations, the first region area can include at least one coding tree unit (CTU), where the CTU includes at least one CTU boundary, and the at least one CTU boundary is located along the at least one region boundary.

A device can include a memory and a processor configured to perform a method that includes obtaining a 360-degree rectangular formatted projected picture, where the 360-degree rectangular formatted projected picture includes at least a first region, the at least first region includes at least one region boundary, and the at least first region includes a first region area; determining at least one guard band area located within the first region area, where the at least one guard band area is located alongside the at least one region boundary, and the first region area further includes a projected region area located outside the at least one guard band area; and coding a current coding block in the at least one guard band area using at least one additional guard band seam artifact reducing sample.

A computer-readable medium can be a non-transitory computer-readable medium that obtains a 360-degree rectangular formatted projected picture, where the 360-degree rectangular formatted projected picture includes at least a first region, the at least first region includes at least one region boundary, and the at least first region includes a first region area; determines at least one guard band area located within the first region area, where the at least one guard band area is located alongside the at least one region boundary, and the first region area further includes a projected region area located outside the at least one guard band area; and codes a current coding block in the at least one guard band area using at least one additional guard band seam artifact reducing sample.

An apparatus can include means for obtaining a 360-degree rectangular formatted projected picture, where the 360-degree rectangular formatted projected picture includes at least a first region, the at least first region includes at least one region boundary, and the at least first region includes a first region area; determining at least one guard band area located within the first region area, where the at least one guard band area is located alongside the at least one region boundary, and the first region area further includes a projected region area located outside the at least one guard band area; and coding a current coding block in the at least one guard band area using at least one additional guard band seam artifact reducing sample.

BRIEF DESCRIPTION OF THE DRAWINGS

Illustrative embodiments of the present application are described in detail below with reference to the following drawing figures:

FIG. 1D is an image illustrating an example of an equatorial cylindrical projected frame, in accordance with some examples.

FIG. 2D is a diagram illustrating an example of an equatorial cylindrical projection, in accordance with some examples.

FIG. 2E is a diagram illustrating an example of an equatorial cylindrical projection, in accordance with some examples.

DETAILED DESCRIPTION

Figure 1A:
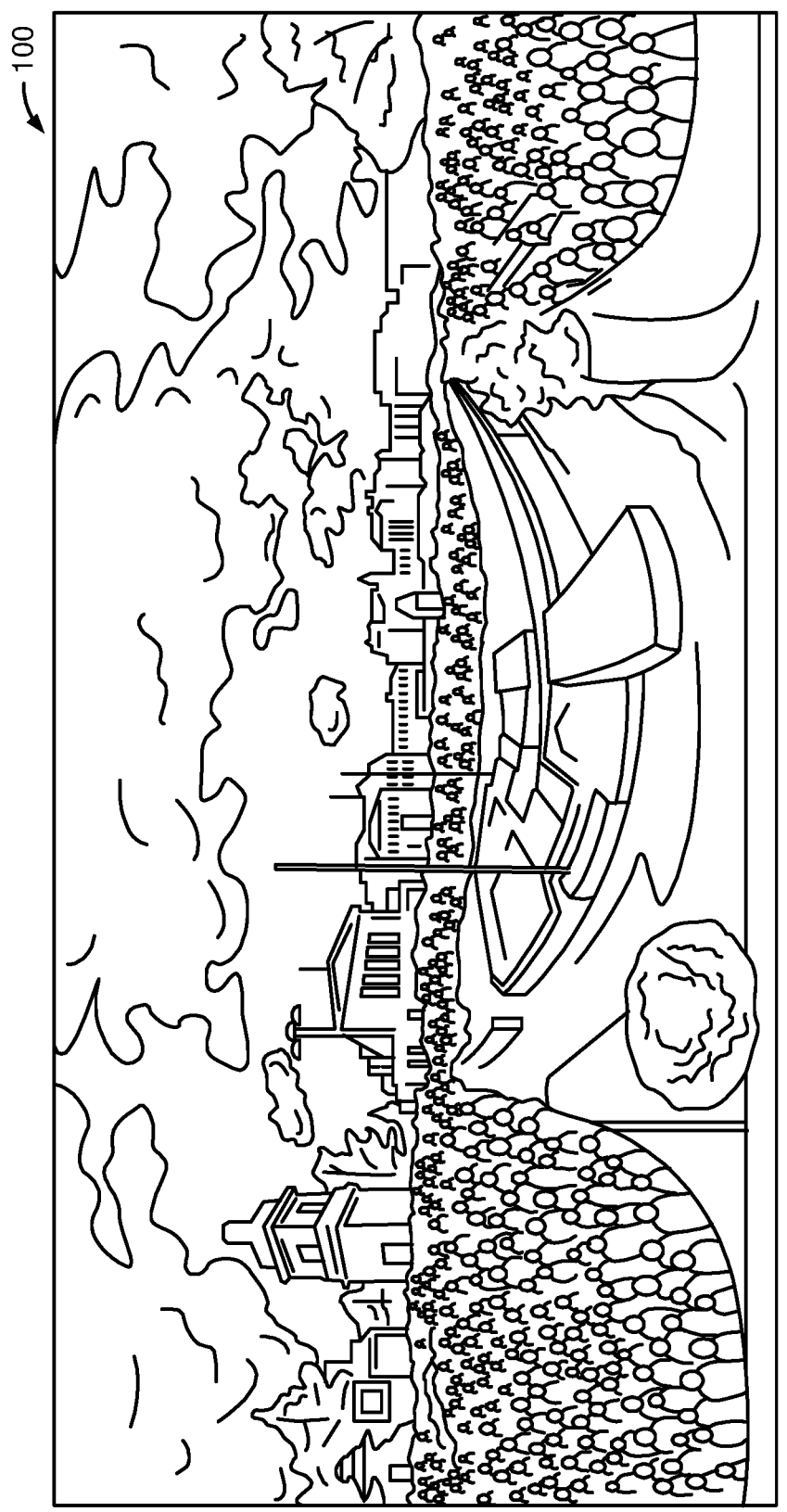
FIG. 1A is an image illustrating an example of an equirectangular projected frame, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Virtual reality (VR) provides the ability to be virtually present in a non-physical world created by the rendering of natural and/or synthetic images and sound correlated by the movements of the immersed user, allowing the user to interact with that world. With the recent progress made in rendering devices (e.g., head mounted displays (HMD)) and in 360-degree video (also referred to as VR or Augmented reality (AR) video in some cases) creation, a significant quality of experience can be offered. VR and/or AR applications include gaming, training, education, sports video, online shopping, and so on.

In some examples, a 360-degree video system can include various components and can perform various steps. For example, a 360-degree video system can include a camera set. The camera set can include multiple individual cameras (virtual or real cameras) pointing to different directions (with different views) and collectively covering various viewpoints around the camera set (or virtual reality scene).

The 360-degree video system can obtain the video pictures captured by the cameras of the camera set, and can perform image stitching. For example, an image stitching device can receive the video pictures from the camera set. In some examples, image stitching includes obtaining the video pictures taken by the multiple individual cameras and synchronizing the video pictures in the time domain and stitching the video pictures in the space (spatial) domain to be a spherical video, but mapped to a rectangular format, such as equi-rectangular (e.g., a world map), cube map, or other shape.

The video in the mapped rectangular format can then be encoded (or compressed) using a video codec (e.g., an MPEG codec, a H.265/HEVC codec, a H.264/AVC codec, or other suitable codec). Details regarding encoding of video data using a video codec are described below.

The compressed video bitstream(s) may be stored and/or encapsulated in a media format and transmitted through a network to a receiver. For example, a transmission side of the 360-degree video system can generate encapsulated files from the encoded video data (e.g., using a ISO base media file format and/or derived file formats). For instance, the video codec can encode the video data and an encapsulation engine can generate the media files by encapsulating the video data in one or more ISO format media files. In some implementations, the compressed bitstream is not stored and/or encapsulated in a media format.

A receiver can then receive the encoded (or compressed) video bitstream(s), possibly encapsulated in a format. A codec in the receiver can decode (or decompress) the encoded video bitstream(s). In some instances, the receiver can parse the media files with encapsulated video data to generate the encoded video data. For example, when a media format is used, the receiver can parse the media files with the encapsulated video data to generate the encoded video data, and the codec in the receiver can decode the encoded video data.

The receiver can then send the decoded video signal to a rendering device. The rendering device can be, for example, an HMD or other rendering device. An HMD can track head movement and eye movement, and can render the corresponding part of the video such that an immersive experience is presented to the user.

Projections and geometric mappings are used to represent three-dimensional (3D) surfaces on two-dimensional (2D) maps using a 3D-to-2D process. For example, in 360-degree video applications, projections and mappings are used to map a 360-degree video represented on a sphere onto a two-dimensional video frame. Examples of 3D-to-2D projections and mappings include, but are not limited to: equirectangular (ERP), cubemap (CMP), adjusted cubemap (ACP), and equatorial cylindrical (ECP). In some geometric mappings (e.g., CMP and ACP), six sided cube images, spatially related to one another, are transformed into a rectangular 2D projections and mappings. In other geometric mappings (e.g., ECP), cylinder geometry can be used.

After stitching of multiple input camera pictures, 360-degree video pictures are typically represented in the ERP format. An equirectangular projection maps points on a sphere to a 2D map by linearly mapping the latitude and longitude of the points on the sphere to x-y coordinates on a picture. A cubemap projection projects the points on the surface of the sphere to points on planes (faces of the cube) that are tangent to the sphere surface. The cubemap projection projects the surface of the sphere onto planes (six faces of the cube) that are tangent to the sphere surface. Adjusted cubemap projection is an enhancement of CMP, which adjusts the sampling on the cube faces to be nearly uniform. Besides the cube geometry, the cylindrical geometry has been utilized to achieve equal-area mapping of the sphere surface onto the projected picture. An equatorial cylindrical projection maps an equatorial sphere segment onto a cylinder. In one example, the ECP operates to project the equatorial region of the sphere between latitudes $\pm \sin^{-1}(2/3) \approx \pm 41.81°$ onto the cylinder geometry, while the circular sphere pole regions are warped into square regions in the projected picture.

Figure 1B:
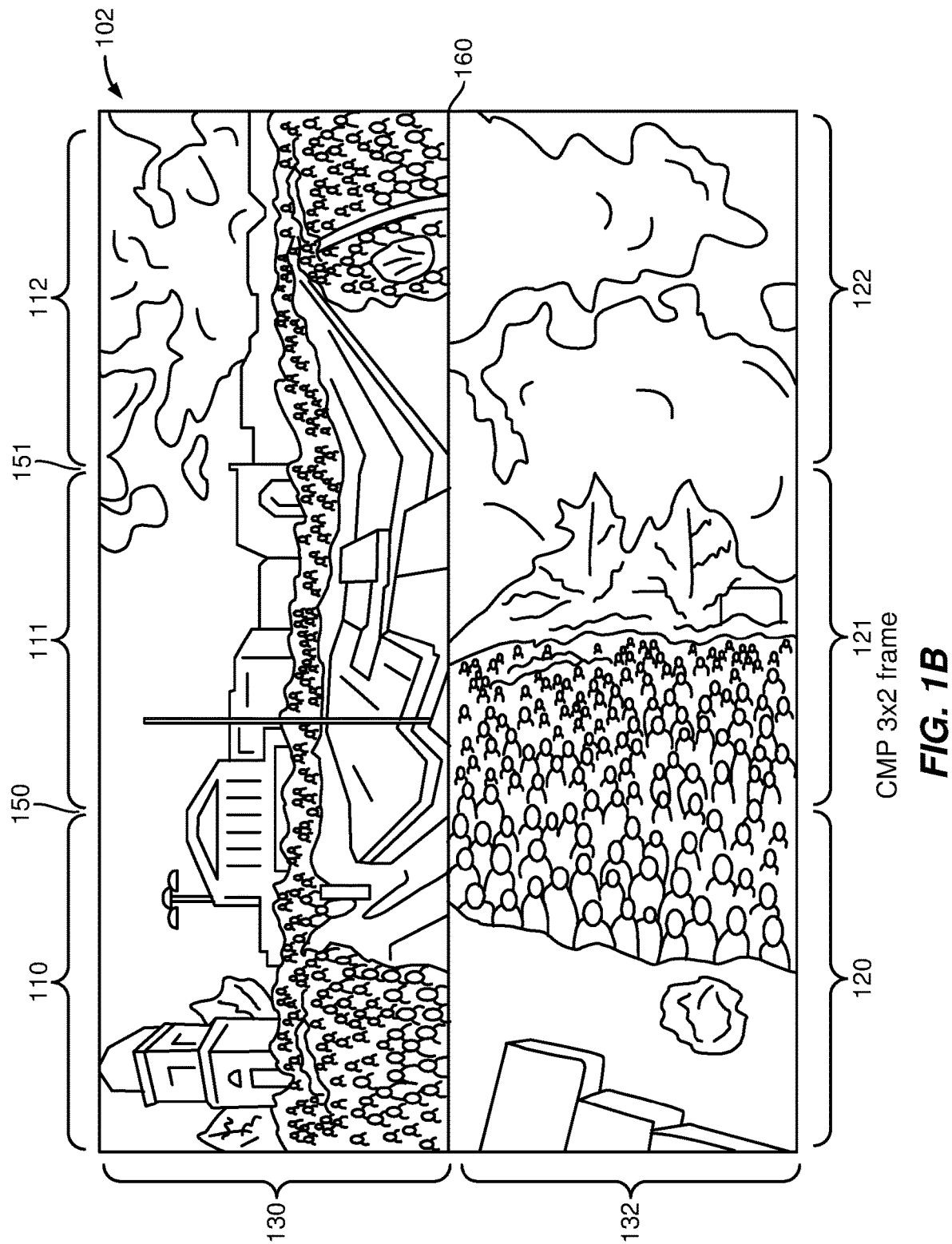
FIG. 1B is an image illustrating an example of a cubemap projected frame, in accordance with some examples.
Figure 1C:
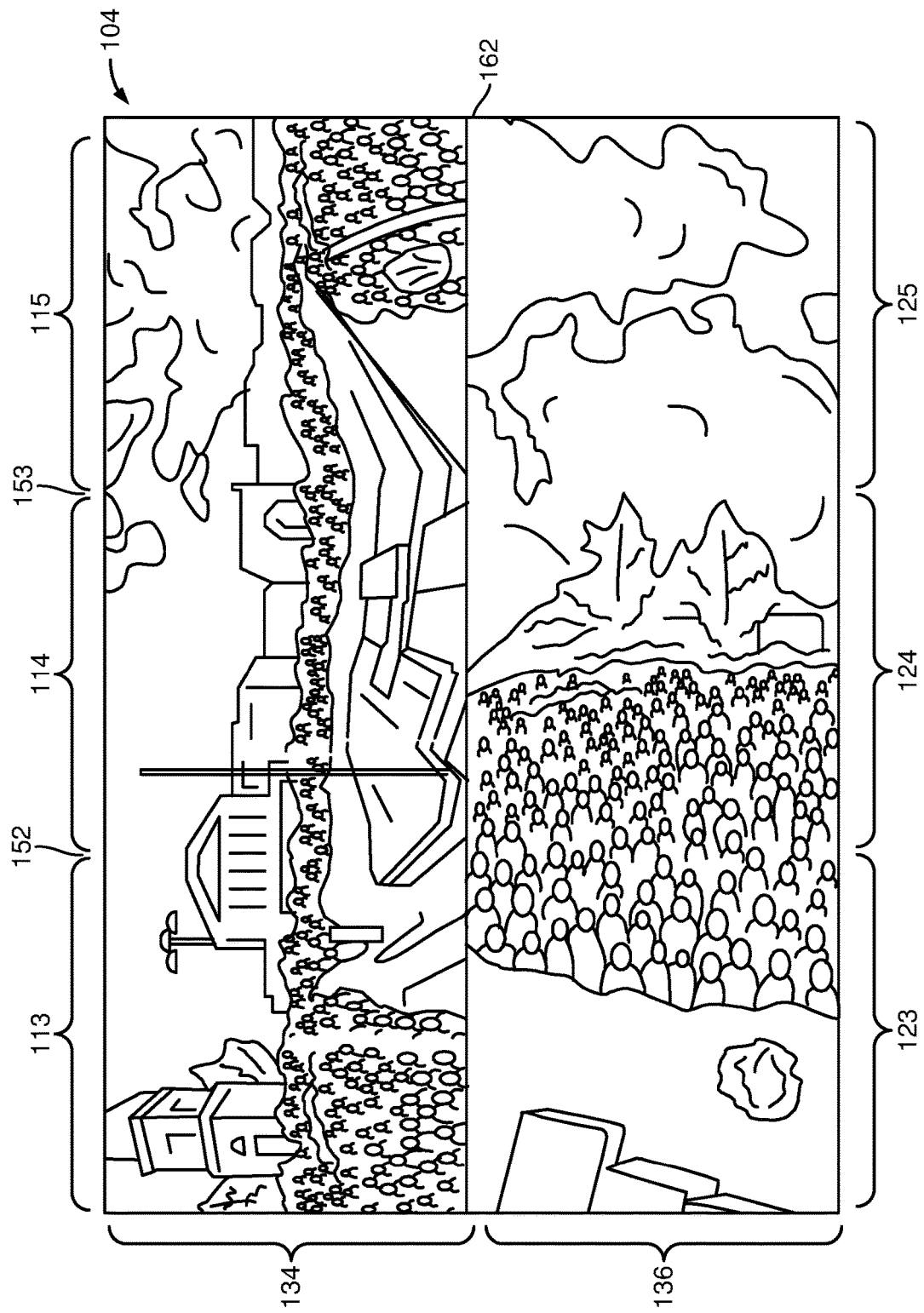
FIG. 1C is an image illustrating an example of an adjusted cubemap projected frame, in accordance with some examples.

FIG. 1 (FIGS. 1A-1D) shows video pictures of the 'PoleVault' sequence obtained with ERP, CMP, ACP and ECP projections. Shown in FIG. 1A, is an ERP frame projection 100, shown in FIG. 1B, is a CMP 3×2 frame projection 102, shown in FIG. 1C, is an ACP 3×2 frame projection 104, and shown in FIG. 1D, is an ECP 3×2 frame projection 106.

FIG. 1B's CMP 3×2 frame projection 102 includes an upper picture half 130 and a bottom picture half 132, and the halves are separated by a horizontal projection boundary 160 (in other projection types it may be vertical). As used herein, a "projection boundary" can represent a boundary between multiple regions (e.g., upper picture half 130 and bottom picture half 132) disposed adjacent to one another along the boundary within the projection domain (e.g., as shown in frame projection 102). In some embodiments, a projection boundary can also represent a boundary between multiple regions (e.g., upper picture half 130 and bottom picture half 132) that are not disposed adjacent to one another along the boundary within the spatial domain.

The upper picture half 130 is divided into the following set of adjacent camera picture regions: a left region 110, a front region 111 and a right region 112, and each of such regions in the upper half 130 are separated from one another by vertical spatial-domain-adjacent region boundaries 150 & 151. The bottom picture half 132 is divided into the following set of adjacent camera picture regions: a bottom region 120, a back region 121, and a top region 122, and each of such regions in the bottom half 132 are separated from one another by vertical spatial-domain-adjacent region boundaries 150 & 151.

FIG. 1C's ACP 3×2 frame projection 104 includes an upper picture half 134 and a bottom picture half 136, and the halves are separated by a horizontal projection boundary 162. The upper picture half 134 is divided into the following set of spatially and projection adjacent camera picture regions: a left region 113, a front region 114 and a right region 115, and each of such regions in the upper picture half 134 are separated from one another by vertical spatial-domain-adjacent region boundaries 152 & 153. The bottom picture half 136 is divided into the following set of spatially and projection adjacent camera picture regions: a bottom region 123, a back region 124, and a top region 125, and each of such regions in the bottom picture half 136 are separated from one another by vertical spatial-domain-adjacent region boundaries 152 & 153.

FIG. 1D's ECP 3×2 frame projection 106 includes an upper picture half 138 and a bottom picture half 139, and the halves are separated by a horizontal projection boundary 163. The upper picture half 138 is divided into the following set of specially and projection adjacent camera picture regions: a left region 116, a front region 117 and a right region 118, and each of such regions in the upper picture half 138 are separated from one another by vertical spatial-domain-adjacent region boundaries 154 & 155. The bottom picture half 139 is divided into the following set of spatially and projection adjacent camera picture regions: a bottom region 126, a back region 127, and a top region 128, and each of such regions in the bottom picture half 139 are separated from one another by vertical spatial-domain-adjacent region boundaries 154 & 155.

Various problems exist in the rendering of 360-degree video via known projections and mappings techniques that transform three-dimensional (3D) surfaces on two-dimensional (2D) maps using a 3D-to-2D process. For example, the existing level of seam/boundary artifacts resulting from the use of such techniques. The seam/boundary artifacts tend to appear when the projected picture consists of adjacent discontinuous regions.

After the projection process, the video pictures are typically compressed with a video encoder (AVC, HEVC, etc.), stored or transmitted, and decoded at the receiver side where the renderer generates the viewport that matches the viewer's head orientation. Depending on this orientation and the field of view, the viewport may cross the outer picture boundaries or inner boundaries within the picture. For boundaries within the picture, the boundaries may be between continuous adjacent regions or discontinuous non-adjacent regions as is shown in FIG. 2.

Figure 2A:
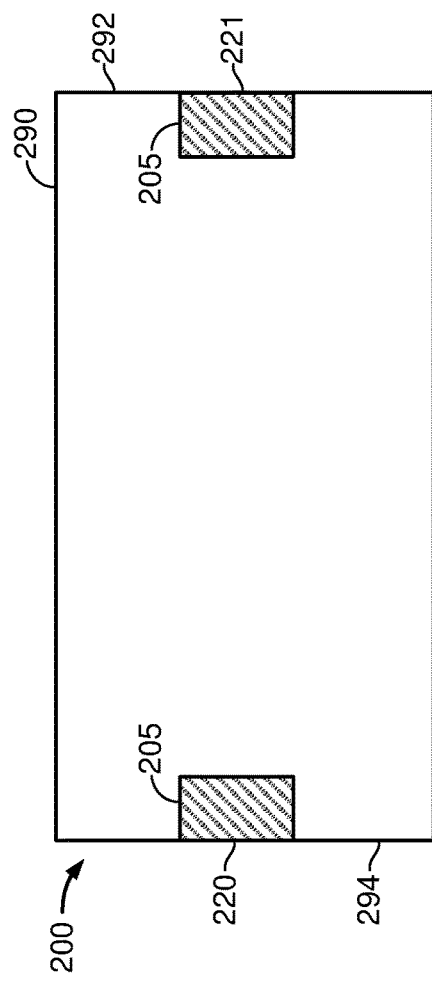
FIG. 2A is a diagram illustrating an example of an equirectangular projection, in accordance with some examples.
Figure 2C:
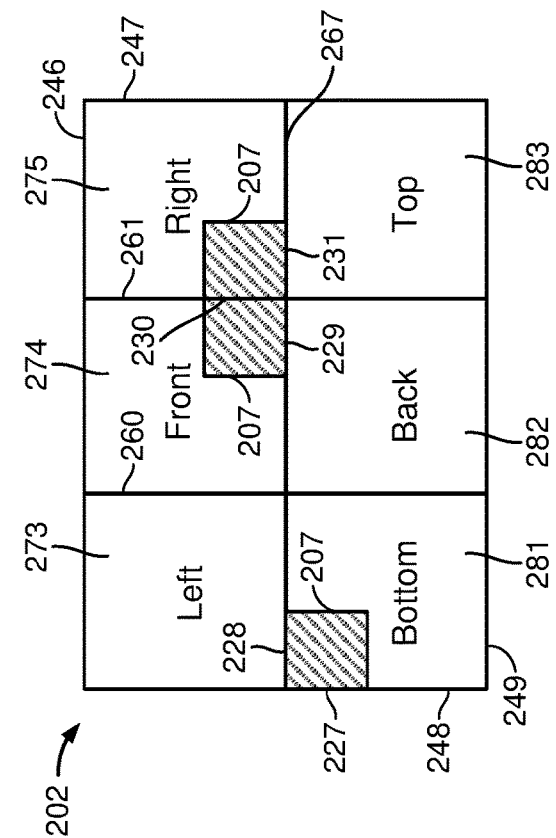
FIG. 2C is a diagram illustrating an example of a cubemap or an adjusted cubemap projection, in accordance with some examples.
Figure 2B:
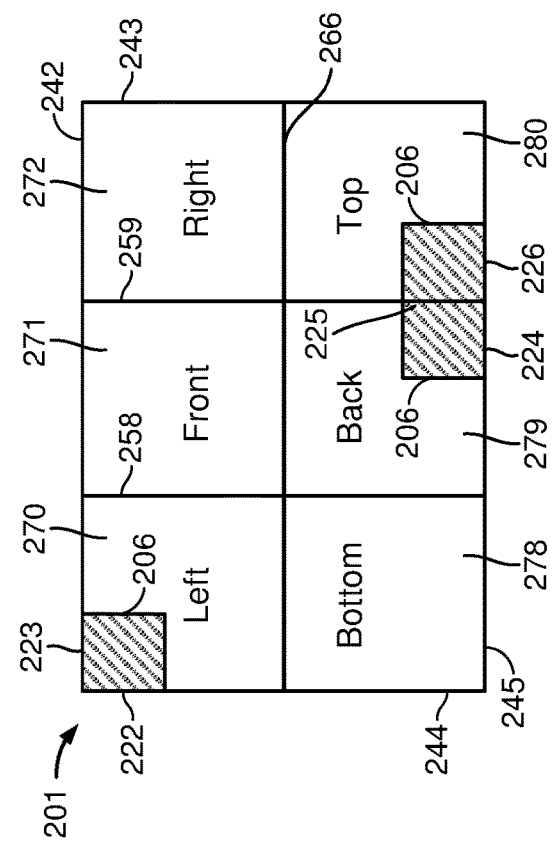
FIG. 2B is a diagram illustrating an example of a cubemap or an adjusted cubemap projection, in accordance with some examples.

FIG. 2 (FIGS. 2A-2D), shows in FIG. 2A, an ERP picture 200. FIG. 2B shows a 3×2 CMP/ACP picture 201. FIG. 2C shows a 3×2 CMP/ACP picture 202. FIG. 2D shows a ECP picture 203. FIG. 2E shows an ECP picture 204.

FIG. 2A, shows an ERP picture 200 that contains outer picture edge boundaries 290-296. ERP picture 200 includes a viewport 205, where the viewport 205 intersects outer picture edge boundary 294 along viewport boundary intersecting edge segment 220 and outer picture edge boundary 292 along viewport boundary intersecting edge segment 221. Here, the full area of the ERP picture 200, in one example, equates to one single region. As an ERP picture, the ERP picture 200, is a full wrap around 360 degree projected picture, the two vertical outer picture boundaries 292, 294, although shown as separate outer picture boundaries, can be said to represent a single vertical spatial-domain-adjacent boundary at the back edge of the ERP picture 200 where pixels alongside the right outer picture boundary 292 represent pixels that are spatially associated with other corresponding pixels alongside the left outer picture boundary 294.

FIG. 2B shows a CMP/ACP picture 201 that contains four outer picture edge boundaries 242-245. CMP/ACP picture 201 contains six regions 270-272, 278-280, where the top half of the CMP/ACP picture 201 is made up of three spatially continuous adjacent regions 270-272, and where the spatially continuous adjacent regions 270-272 are separated from one another along vertical spatial-domain-adjacent boundaries 258, 259. The bottom half of the CMP/ACP picture 201 contains three spatially continuously adjacent regions 278-280, where the spatially continuously adjacent regions are separated from one another along vertical spatial-domain-adjacent boundaries 258, 259. The CMP/ACP picture's 201 top half (270-272 together) and bottom half (278-280 together) are separated from one another by a horizontal projection boundary 266. CMP/ACP picture 201 includes a viewport 206, where the viewport 206, for its portion located within a left region 270, intersects the left outer picture edge boundary 244 along viewport boundary intersecting edge segment 222, and also intersects the top outer picture edge boundary 242 along viewport boundary intersecting edge segment 223. The viewport 206, for its portion located within back region 279, intersects bottom outer picture boundary 245 along viewport boundary intersecting edge segment 224 and intersects vertical spatial-domain-adjacent region boundary 259 along viewport boundary intersecting edge segment 225. The viewport 206, for its portion located within top region 280, intersects bottom outer picture boundary 245 along viewport boundary intersecting edge segment 226 and intersects vertical spatial-domain-adjacent adjacent picture boundary 259 along viewport boundary intersecting edge segment 225.

FIG. 2C shows a CMP/ACP picture 202 that contains four outer picture edge boundaries 246-249. CMP/ACP picture 202 contains six regions 273-275, 281-283, where the top half of the CMP/ACP picture 202 contains three spatially continuous adjacent regions 273-275, and where the spatially continuous adjacent regions are separated from their adjacent counterparts along vertical spatial-domain-adjacent region boundaries 260, 261. The bottom half of the CMP/ACP picture 202 contains three spatially continuous adjacent regions 281-283, where the spatially continuously adjacent regions are separated from their adjacent counterpart regions along vertical spatial-domain-adjacent region boundaries 260, 261. The CMP/ACP picture's 202 top half (273-275 together) and bottom half (281-283 together) are separated from one another by a horizontal projection boundary 267. CMP/ACP picture 202 includes a viewport 207, where the viewport 207, for its portion located within a front region 274, intersects the horizontal projection boundary 267 along viewport boundary intersecting edge segment 229, and also intersects the vertical spatial-domain-adjacent region boundary 261 along viewport boundary intersecting edge segment 230. The viewport 207, for its portion located within right region 275, intersects horizontal projection boundary 267 along viewport boundary intersecting edge segment 231, and intersects vertical spatial-domain-adjacent picture/region boundary 261 along viewport boundary intersecting edge segment 230. The viewport 207, for its portion located within bottom region 281, intersects left outer picture boundary 248 along viewport boundary intersecting edge segment 227, and intersects horizontal projection boundary 267 along viewport boundary intersecting edge segment 228.

FIG. 2D shows an ECP picture 203 that contains four outer picture edge boundaries 250-253. ECP picture 203 contains four regions 276, 284-286, where the top half of the ECP picture 203 comprises front region 276, where front region 276 represents three-fourths of a cylinder and spans the top half of the ECP picture 203. The bottom half of the ECP picture 203 contains three spatially continuous adjacent regions 284-286, where the spatially continuous adjacent regions are separated from their adjacent counterpart regions along vertical spatial-domain-adjacent region boundaries 262, 263. The ECP picture's 203 top half 276 and bottom half (284-286 together) are separated from one another by a horizontal projection boundary 268. ECP picture 203 includes a viewport 208, where the viewport 208, for its portion located within a front region 276, intersects the left outer picture boundary 252 along viewport boundary intersecting edge segment 232, and also intersects the top outer picture boundary 250 along viewport boundary intersecting edge segment 233. The viewport 208, for its portion located within back region 285, intersects bottom outer picture boundary 253 along viewport boundary intersecting edge segment 234 and intersects vertical spatial-domain-adjacent region/picture boundary 263 along viewport boundary intersecting edge segment 235. The viewport 208, for its portion located within top region 286, intersects bottom outer picture boundary 253 along viewport boundary intersecting edge segment 236 and intersects vertical spatial-domain-adjacent region/picture boundary 263 along viewport boundary intersecting edge segment 235.

FIG. 2E shows an ECP picture 204 that contains four outer picture edge boundaries 254-257. ECP picture 204 contains four regions 277, 287-289, where the top half of the ECP picture 204 comprises front region 277, where front region 276 represents three-fourths of a cylinder and spans the top half of the ECP picture 204. The bottom half of the ECP picture 204 contains three spatially continuous adjacent regions 287-289, where the spatially continuous adjacent regions are separated from their adjacent counterpart regions along vertical spatial-domain-adjacent region boundaries 264, 265. The ECP picture's 204 top half 277 and bottom half (287-289 together) are separated from one another by a horizontal projection boundary 269. ECP picture 204 includes a viewport 209, where the viewport 209, for its portion located within a front region 277, intersects the horizontal projection boundary 269 along two viewport edge segments 239 & 240. The viewport 209, for its portion located within bottom region 287, intersects left outer picture boundary 256 along viewport boundary intersecting edge segment 237, and intersects horizontal projection boundary 269 along viewport boundary intersecting edge segment 238.

Depending on the orientation and the field of view, and as shown in FIG. 2 (FIGS. 2A-2E), the viewports 205-209 may cross (1) the outer edge picture boundaries 242-257, 290-296 or (2) vertical spatial-domain-adjacent region boundaries 258-265 within the picture between groups of adjacent regions (e.g., (270/271/272), (273/274/275), (278/279/280), (281/282/283), (284/285/286), (287/288/289)) or (3) horizontal projection boundaries 266-269 between non-spatially-adjacent regions (e.g., 270/278, 271/279, 272/280, 273/281, 274/282, 275/283, 276/284, 276/285, 276/286, 277/287, 277/288, 277/289). The viewport edge segments 220-240, as shown, are where the viewport regions 202-210 cross such boundaries (outer picture, adjacent & non-adjacent).

In at least one example, for example the ERP case in FIG. 2A showing projected picture 200, the left 294 and right 292 outer picture boundaries wrap around the back of the sphere, hence, a viewport 205 that is orientated towards the back of the sphere may cross the left 294 and right 292 outer picture boundaries. The region in the ERP picture that is available, and in some examples, required to render the viewport is represented by shaded rectangles 205 for illustrative purposes (generally the shape may not be rectangular). The boundaries within the region required for rendering are represented, in FIG. 2A, by two line segments 220, 221.

In at least one example, the case of 3×2 frame packing of the CMP or ACP cube faces as illustrated in FIGS. 1B and 1C, the viewport, as shown in FIGS. 2B and 2C, (206 & 207) may cross various boundaries as shown as bold boundary edge segments 222-226 and 227-231, (FIGS. 2B and 2C respectively). Although, as shown, the left 270, 273, front 271, 274, and right 272, 275 cube faces/regions are placed adjacent in the top picture half, there is exists a vertical spatial-domain-adjacent region boundary 258, 260 between the left 270, 273 and front faces/regions 271, 274, and between the front 271, 274 and right 272, 275 faces/regions where, for example, lines are broken as is visible in FIGS. 1B and 1C, and similarly for the bottom picture half, where there is a vertical spatial-domain-adjacent region boundaries 259, 261 between the top 280, 283 and back 279, 282 region/faces, and a vertical spatial-domain-adjacent region boundary 258, 260 between the bottom 278, 281 and back

279, 282 face/regions. These vertical spatial-domain-adjacent region boundaries 258-265 (FIGS. 2B-2E) between adjacent cube faces are less discontinuous than (1) the actual picture boundaries 242-257 and (2) the horizontal projection boundaries 266-269 between the top 270/271/272, 273/274/ 275, 276, 277 (FIGS. 2B-2E) and bottom 278/279/280, 281/282/283, 284/285/286, 287/288/289) halves of the picture. FIGS. 2B and 2C illustrate two viewports 206, 207 with regions used for rendering that cross various boundaries. In these examples, a 3×2 packing of the cube faces is chosen, however, alternative packing schemes exist that have different boundaries (e.g., 1×6, 6×1, etc.) which represent other alternative examples. The 3×2 packing has one of the fewest boundaries of the packing schemes.

In at least one example, for example the case of the ECP boundaries illustrated in FIGS. 2D and 2E with packing that is similar to the 3×2 packing of CMP and ACP. In this example, the main difference is that the top picture half, containing "front" region 276, 277, is a continuous region corresponding with a full three quarters of the unwrapped cylinder which is used to project the equatorial region of the sphere. In this packing, one quarter of the unwrapped cylinder, as contained in back regions 284-286, 287-289, is placed in the back position. Compared with CMP and ACP (FIGS. 2B & 2C), for example, lines are not broken at any boundary within the front region 276, 277 (FIGS. 2D & 2E), however, lines are curved due to the cylindrical projection. In this ECP example (FIGS. 2D & 2E), other boundaries are equivalent with CMP and ACP (FIGS. 2B & 2C) boundaries, with some additional discontinuity between the top (280, 283 (FIGS. 2B & 2C)) (286, 289 (FIGS. 2D & 2E)) and back (279, 282 (FIGS. 2B & 2C)), (285, 288 (FIGS. 2D & 2E)) regions, and the bottom (278, 281 (FIGS. 2B & 2C)), (284, 287 (FIGS. 2D & 2E)) and back (279, 282 (FIGS. 2B & 2C)), (285, 288 (FIGS. 2D & 2E)) regions due to minor misalignment in the ECP scheme. Other alternative exemplary packing schemes (not shown), such as 6×1 or 1×6, keep the unwrapped cylinder region connected, however, in such examples, additional boundaries are present between the cylindrical region and the pole regions.

Figure 3A:
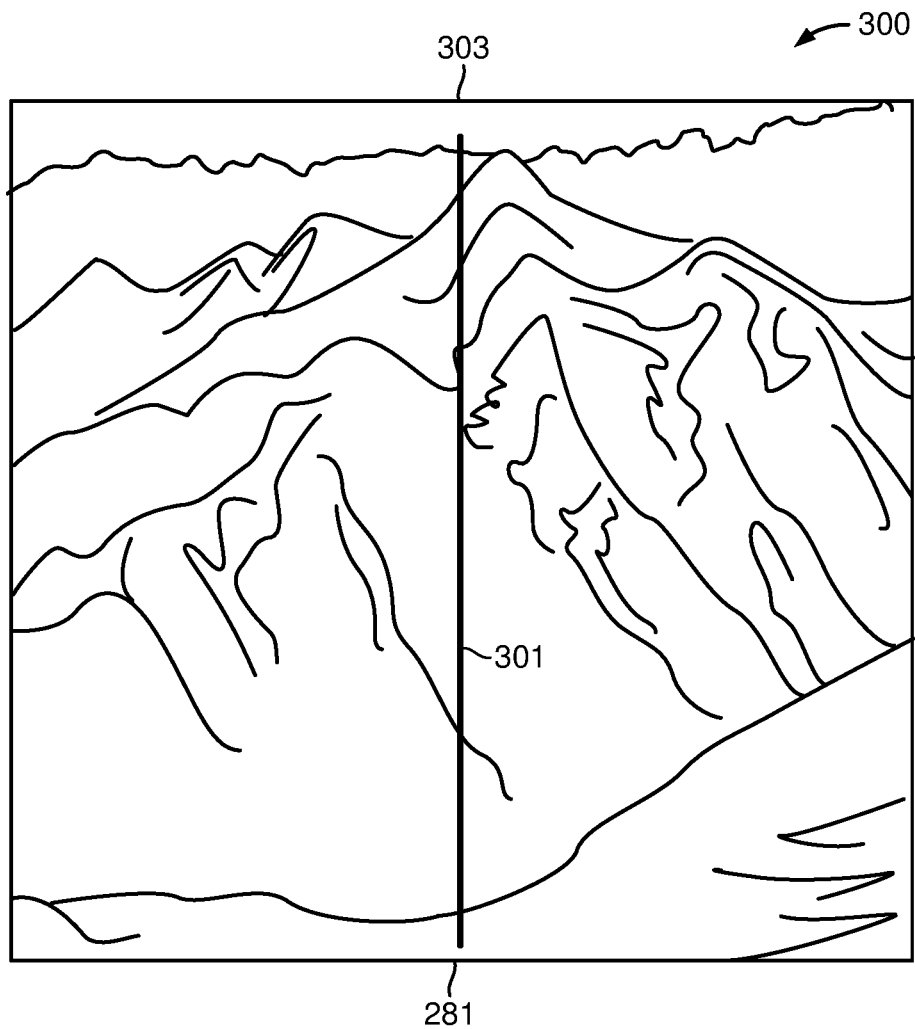
FIG. 3A is an image illustrating an example of a rendered viewport seam/boundary due to motion, in accordance with some examples.
Figure 3B:
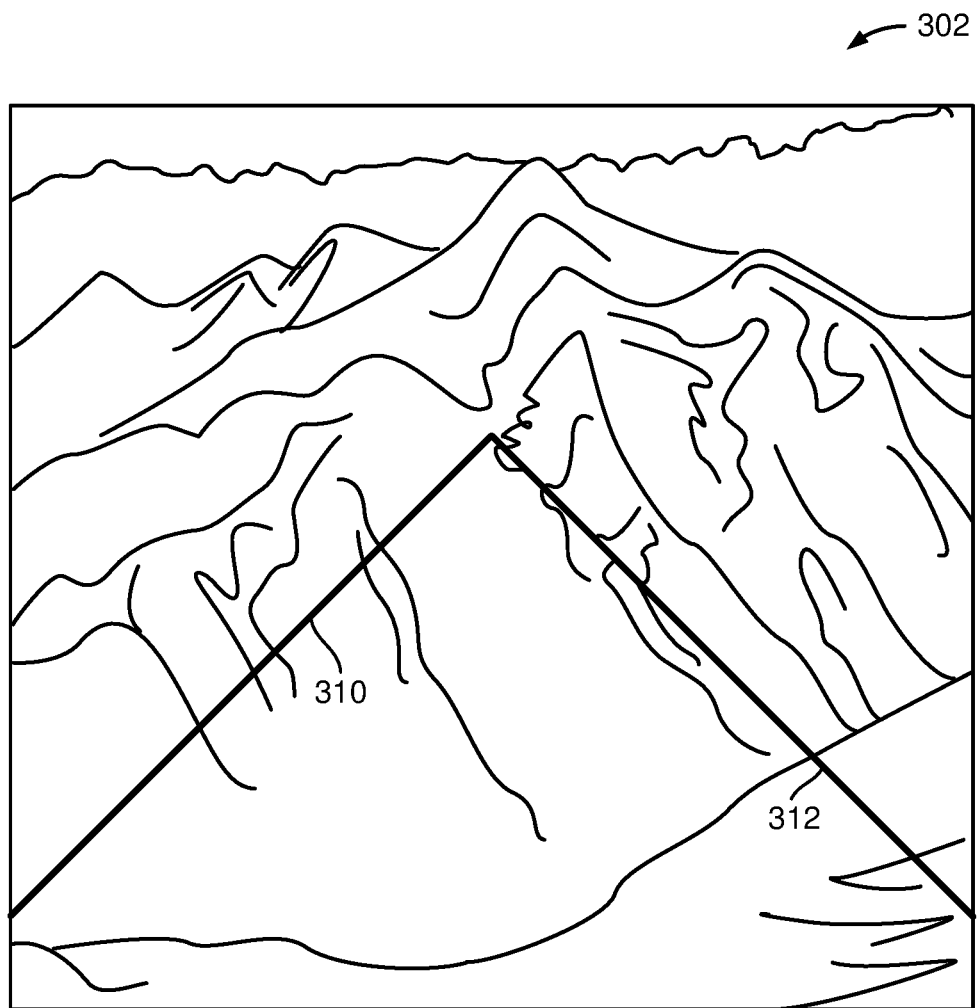
FIG. 3B is an image illustrating an example of viewport seam/boundary due to filtering, in accordance with some examples.

The three types of picture boundaries, (1) the outer picture boundaries, (2) the vertical spatial-domain-adjacent region boundaries located between pictures that are adjacent to one another in the pre-stitched camera pictures and where such boundary represents a stitched boundary between two spatially adjacent regions, and (3) the horizontal projection boundaries located between pictures, where such pictures are not spatially adjacent to one another in in the pre-stitched camera pictures, and all three types of picture boundaries are within the projected picture, and may be associated with visible seam/boundary artifacts within the rendered viewport. The following are two examples of potential causes: Example 1 potential cause, is related to motion. In at least one example, for example the case of motion across the outer picture boundary directed into the region, the motion estimation process may select a block that partially includes the padded samples that the encoder adds to extend the reference pictures. At higher quantization parameter (QP) values, those padded samples appear on one side of the boundary in the viewport, while the other side of the boundary is different as illustrated in FIG. 3A. (FIG. 3A represents an example of rendered viewport seam/boundary 301 (vertically down the center of the image) due to motion). This type of seam/boundary artifact is strong at higher QP values. A similar problem occurs, in some examples, inside the CMP or ACP picture (3×2 packing) (FIGS. 2B & 2C), when motion estimation selects a block that is located partially across the middle picture boundary. In some examples a similar problem occurs related to In-loop filtering (deblocking, sample adaptive offset). In at least one example, where filtering is disabled on the picture boundaries, a sharp unfiltered seam/boundary may be visible in the rendered viewport especially at higher QP values. In the CMP or ACP picture (3×2 packing), the filtering may occur across the middle picture boundary resulting in visible seam/boundary artifacts as illustrated in FIG. 3B. (FIG. 3B shows a viewport seam/boundary 310, 312 due to filtering).

Systems and methods are disclosed herein that address problems such as those noted above. For example, to address the problems associated with relatively numerous seam/ boundary artifacts, multiple systems and methods are proposed such as (1) projected picture adaptations (encoder/ decoder), (2) video encoder only modifications, and (3) a hybrid model. In a projected picture adaptations exemplary approach, the projected picture is adapted such that during the rendering stage the seams/boundaries are prevented. An example of such an approach is the use of guard bands. In a video encoder only modifications exemplary approach, the encoder may be projection aware and may make internal modifications that are standard compliant (AVC, HEVC, etc.) to prevent the projection seams/boundaries in the rendering stage. In a hybrid exemplary approach, both video encoder and projected picture modifications may be combined to achieve improved seam/boundary artifact reduction results.

The following are further detailed examples of the projected picture adaptations exemplary approach including a $1^{st}$ example titled guard bands symmetrically distributed around the regions of the projected picture, and a $2^{nd}$ example titled guard bands asymmetrically distributed in the projected picture.

Guard bands are regions/areas added into the projected picture consisting of additional samples (seam artifact reducing samples) (e.g., pixels) that are not essential for projecting the picture back onto the sphere, but they can be helpful in reducing artifacts such as seams/boundaries on the sphere or in the rendered viewport with the artifacts being the result of the video encoder actions such as motion compensated prediction, in-loop filtering, quantization, etc. Samples that are not essential for projecting the picture back onto the sphere and that are used to reduce artifacts associated with seams/boundaries are described herein as seam artifact reducing samples. The samples in the guard band may include additional seam artifact reducing projected samples, i.e., samples obtained around (spatially nearby) the projected regions with the same projection process, for example, the CMP, ACP, or ECP processes. For example, where a first point is located near an edge of a front region/face cube in a cube geometry, and where there exists a second point/sample in a spatially nearby location on a neighboring top region/face, such spatially nearby points may be relocated away from one another in an associated CMP, ACP or ECP projection including such regions/faces. The spatial proximity and location of all the pixels generated in associated CMP, ACP or ECP algorithms/calculations can be used in the associated projection process and can be used to identify the spatial proximity between any two locations regardless of where they are located on the projected picture.

There are other options for guard band seam artifact reducing samples such as gradient samples (e.g., via a gradient operation) that transition from one region to a second region in the projected picture, or a combination of projected samples with gradients or blends, or duplicated samples where the boundary samples of the projected region (e.g., around an edge of the region) are duplicated to the guard band region. In general, the guard band seam artifact reducing samples may be obtained so that the compression efficiency is preserved while reducing the seam/boundary artifacts. The guard band regions typically are defined by a width and a location around the perimeter of the projected region in the picture, and can be further described as, the location being alongside a particular region boundary and the width extending from such particular region boundary's edge into such region. For example, the guard bands may be present along all sides/edges/boundaries (perimeter) of a cube face, which is the symmetric case, or the guard bands may be placed along only some sides/edges/boundaries that contribute most to the artifact reduction in the viewport, which is the asymmetric case. Since the guard band regions (including additional guard band seam artifact reducing samples) are added to the projected picture before the video encoding, the guard band regions are available to the video encoding processes for prediction such as motion compensated prediction, etc., which may improve prediction. However, the use of the samples for prediction in the video encoding processes may be prohibited by signalled information, for example, in the file format, etc., as further described in Miska M. Hannuksela, Igor D. D. Curcio, "OMAF: Guard band signalling", MPEG Doc. M40408, Hobart, Australia, April 2017, and Byeongdoo Choi, Ye-Kui Wang, Miska M. Hannuksela, Youngkwon Lim, "Text of ISO/IEC DIS 23090-2 Omnidirectional Media Format", MPEG Doc. N16824, Hobart, Australia, April 2017.

Figure 4A:
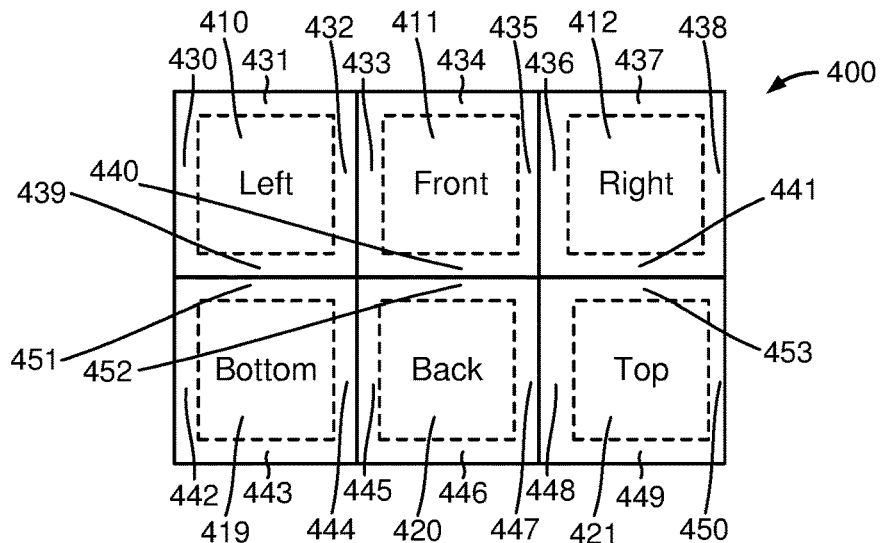
FIG. 4A is a diagram illustrating an example of a guard band scheme for a 3×2 packed cubemap or an adjusted cubemap projection, in accordance with some examples.
Figure 4B:
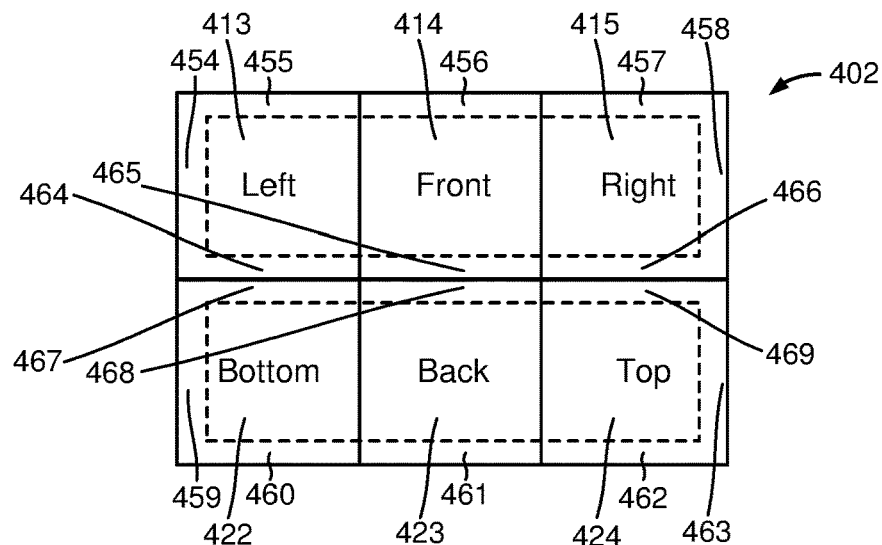
FIG. 4B is a diagram illustrating an example of a guard band scheme for a 3×2 packed cubemap or an adjusted cubemap projection, in accordance with some examples.
Figure 4C:
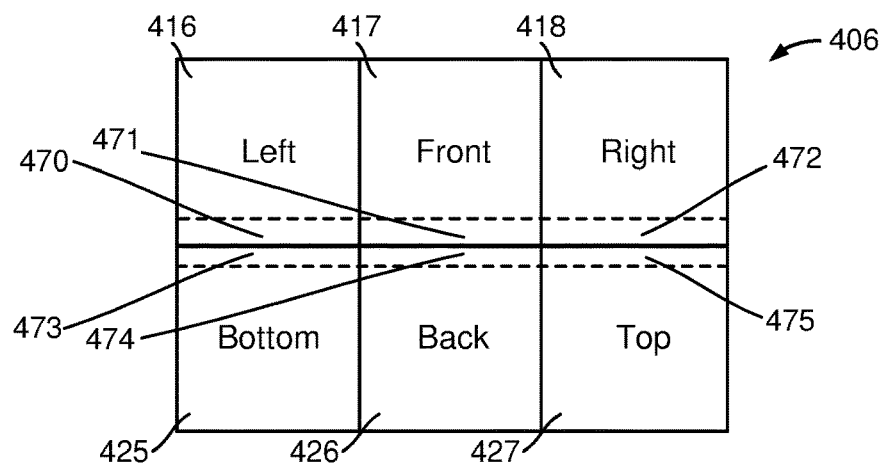
FIG. 4C is a diagram illustrating an example of a guard band scheme for a 3×2 packed cubemap or an adjusted cubemap projection, in accordance with some examples.

FIG. 4 (FIGS. 4A-4C) illustrates various guard band exemplary schemes for 3×2 packed CMP and ACP pictures 400-406, which may be based on the cube geometry with six faces/regions, 410-412, 419-421, as shown in FIG. 4A. FIG. 4A shows projected picture 400, there is a guard band 430-453 alongside every cube face/region (410-412, 419-421) boundary ((areas outside of dashed lines) (430-435)) such that the cube face/region (non-guard band area) area remains square. This is an example of a symmetric guard band case. In general, the guard band width may vary depending on the cube face side, which is the asymmetric guard band case. Examples are depicted in FIGS. 4B and 4C. FIG. 4B, showing projected picture 402, is an example of the case where the guard bands 454-469 are added alongside the top (413-415 together) and bottom (422-424 together) 3×1 halves of the projected picture 402. The reason is that the cube faces/regions within each of the top (413-415 together) and bottom (422-424 together) halves are adjacent to one another in the respective halves, along vertical spatial-domain-adjacent region boundaries, is to avoid discontinuous edges within such respective halves. The assumption to support this type of guard band regions is that the seam/boundary artifacts corresponding with the camera picture adjacent to one another in the space domain are often less visible in the rendered viewport and, hence, in at least one example, need no guard band. Note that for each face/region in the top half (413-415 together), for example, the non-guard band areas (the areas cut out from the original face/region: face/region minus the guard band) represent rectangular non-square areas which is different from their original square geometry before the application of the associated guard area. Other original square faces/regions in many of the examples herein are also changed to non-square areas (non-guard band areas) after the application of the associated guard regions. In FIG. 4C, showing projected picture 406, the guard band regions 470-475 may be only applied around and alongside the horizontal projection boundary between top (416-418 together) and bottom (425-427 together) picture halves to avoid the in-loop filtering that may occur in the encoding process across this non-spatial-domain-adjacent middle boundary. This type of seam/boundary artifacts is known to be typically very problematic in the rendered viewport and, therefore, this guard band type may be recommended in case, for example, the in-loop filtering cannot be disabled by other means in the encoder. Further discussion can be found in the discussion below on Video Encoder-Only Modifications.

Figure 5A:
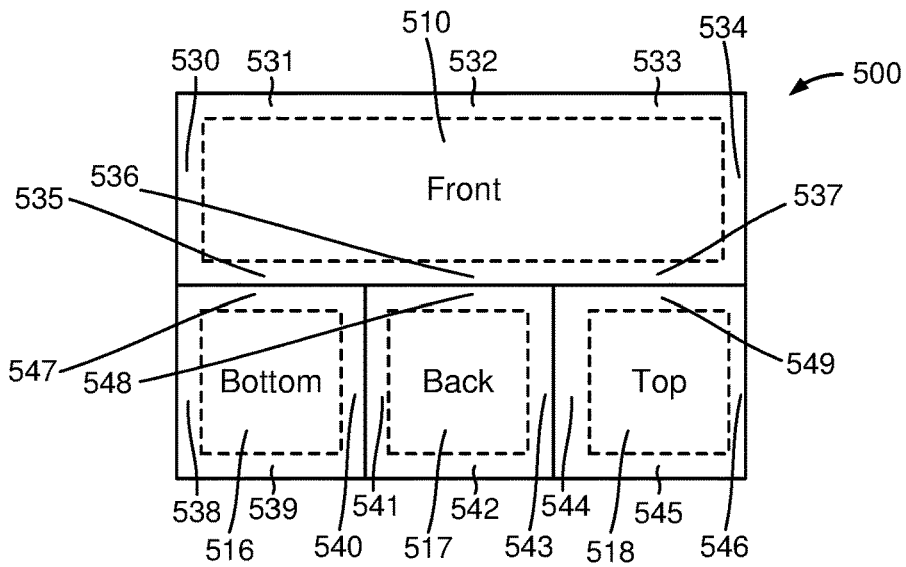
FIG. 5A is a diagram illustrating an example of a guard band scheme for a 3×2 packed equirectangular projection, in accordance with some examples.
Figure 5B:
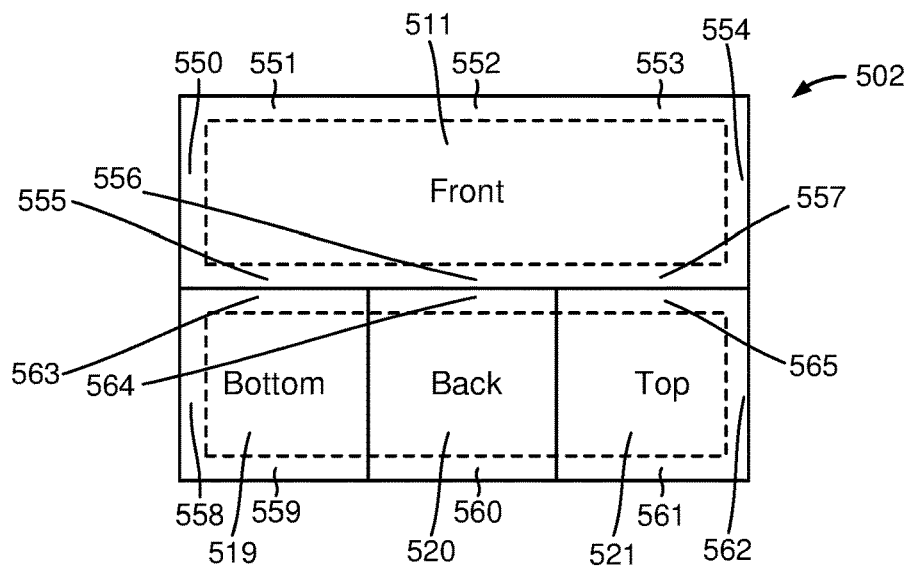
FIG. 5B is a diagram illustrating an example of a guard band scheme for a 3×2 packed equirectangular projection, in accordance with some examples.
Figure 5C:
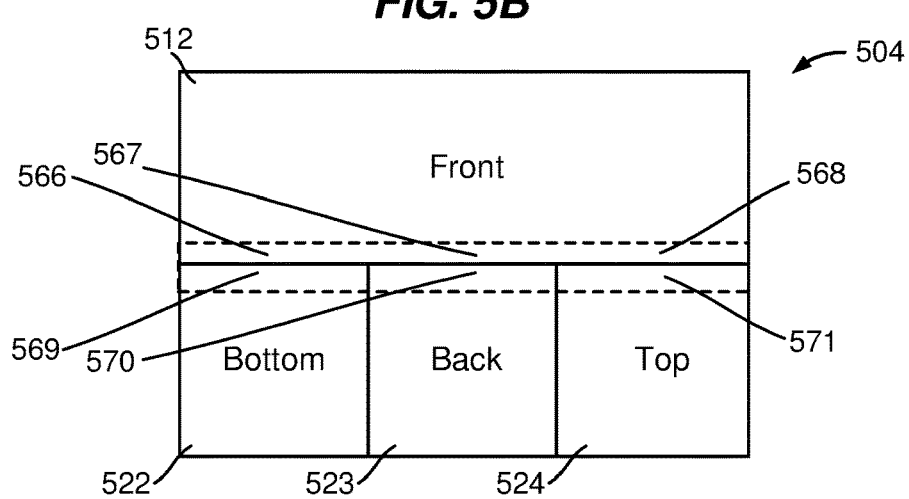
FIG. 5C is a diagram illustrating an example of a guard band scheme for a 3×2 packed equirectangular projection, in accordance with some examples.
Figure 5D:
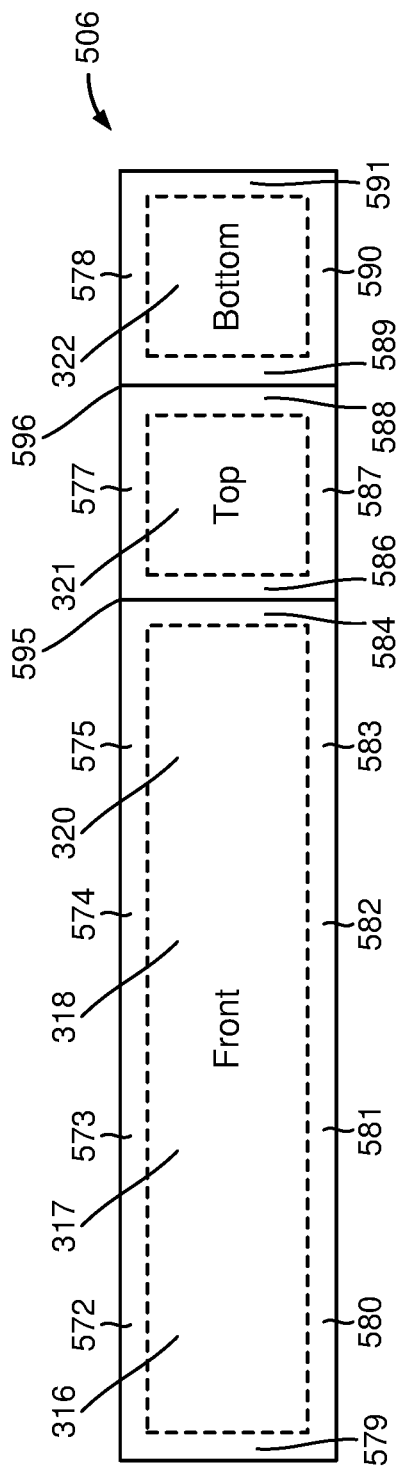
FIG. 5D is a diagram illustrating an example of a guard band scheme for a 6×1 packed equirectangular projection, in accordance with some examples.
Figure 5E:
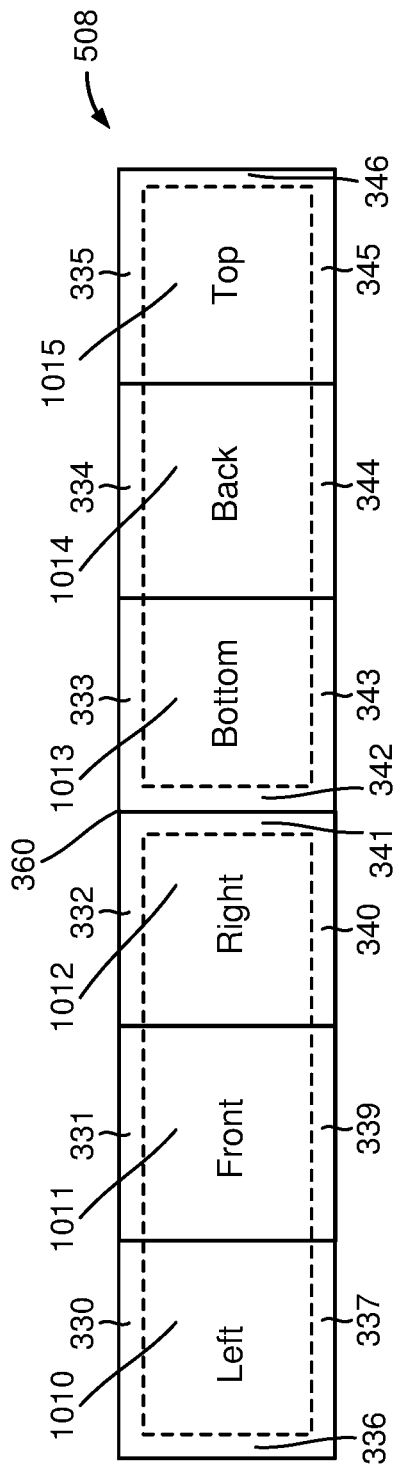
FIG. 5E is a diagram illustrating an example of a guard band scheme for a 6×1 packed equirectangular projection, in accordance with some examples.

FIG. 5 (FIGS. 5A-5E), showing projected pictures 500-508, depicts guard band regions 530-591, 330-346 for ECP pictures and a CMP/ACP picture (e.g., 3×2 packed ECP in FIGS. 5A-5C; 6×1 packed ECP in FIG. 5D; and 6×1 packed CMP/ACP in FIG. 5E). A difference with guard bands for the cube geometry (e.g., FIG. 5E) may be exemplified in that in ECP packing, there is a three-fourths of a cylinder region (labeled "Front" in these examples) that is not split (e.g., FIGS. 5A-5D).

FIG. 5A, showing projected picture 500, depicts a symmetric guard band region case with a guard band area (530-536 together) around top picture half 510, and guard bands (537-548 together) within the bottom picture half (516-518 together), and more specifically, a guard band 544-546, 549 around top region 518, a guard band 538-540, 547 around bottom region 516, and a guard band 541-543, 548 around back region 517. Here, top picture half 510 comprises, in the same location and area, a three-fourths of a cylinder front region. FIGS. 5B and 5C, showing projected pictures 502, 504, depict asymmetric case examples, with FIG. 5B showing guard bands 550-565 around the top 511 and bottom (519-521 together) 3×1 picture halves, and with FIG. 5C showing guard bands 566-571 alongside (above and below) a horizontal projection boundary between top 512 and bottom (522-524 together) picture halves.

In other examples, ECP may be packed 1×6 or 6×1 as depicted in FIG. 5D, showing projected picture 506, where the cylinder region (316-320 together) is not split (6×1 packed ECP with guard regions). FIG. 5D shows projected picture 506, with three faces/regions, a 360 cylinder region face (316-320 together), a top face 321 and a bottom face 322, and each face having respective guard band areas 572-591. In FIG. 5D, two vertical projection boundaries 595, 596 are shown, a first boundary 595 between the 360 cylinder region face (316-320 together) and the top face/region 321, and a second boundary 596 between the top face/region 321 and the bottom face/region 322. Although the cylinder region is not split and is represented in the form of front face (316-20 together), such front face (316-20 together) corresponds to the four: front, left, right and back, of the original cube geometry (i.e., a 360 cylinder region).

In another example, CMP/ACP may be backed 1×6 or 6×1 as depicted in FIG. 5E, showing projected picture 508. FIG. 5E shows projected picture 508, with six faces/regions 1010-1015 and each face having guard bands 330-346. In FIG. 5E, a vertical discontinuous projection-only-adjacent region boundary 360 is shown between bottom region 1013 and right region 1012.

Depending on the packing type, the number of guard bands may be different. For example, the case represented in 5B is shown as having 16 guard bands (550, 551, 552, 553, 554, 555, 556, 557, 558, 559, 560, 561, 562, 563, 564, 565) (one guard band counted per face side (noting that there are 3 face sides within the top picture (front) half)) while the case represented in 5D is shown as having 18 guard bands ((572, 573, 574, 575, 577, 578, 579, 580, 581, 582, 583, 584, 586, 587, 588, 589, 590, 591) (noting that there are 4 face sides within face region (316-320 together). Hence, for similar guard band protection, in some examples, the 3×2 packing type could be more favorable.

The presence of guard bands per region and the guard band width may be signaled, for example, in the file format, etc. The presence of guard bands may also be QP dependent. For example, at low QP values, the guard band may be avoided or its width may be reduced.

The following represent examples of implementations of guard bands utilizing projected samples, i.e., samples obtained around the projected regions with the same projection process. Such examples are applicable to both ACP and CMP approaches. Although many of the following examples and example calculations correspond to specific 3×2 cube geometries, other examples can include other example calculations and where those example calculations can correspond to other cube geometries, for example, 6×1, 1×6, 2×3 cube geometries.

Denote the dimension of any square face as A×A in sample units. For 2D-to-3D coordinate conversion, given the position (m,n) on a given face f, (u,v) is first calculated as:

$$u=(m+0.5)*2/A-1, 0 \le m < A, -1 < u < 1$$

$$v=(n+0.5)*2/A-1, 0 \le n < A, -1 < v < 1.$$

For symmetrical guard bands, i.e., guard bands applied to the four sides of the cube faces, the following padfactor is defined:

$$\text{padfactor} = 1 + \frac{2 \times \text{padmargin}}{A - 2 \times \text{padmargin}}$$

with padmargin specifying the width of the guard bands in sample units (being smaller than A/2), for example, 4 samples. Subsequently, the (u, v) coordinates are scaled into (u', v') with padfactor as follows:

$$u'=u \times \text{padfactor}, v'=v \times \text{padfactor}$$

This extends the cube face to sample additional boundary samples from the sphere. In the ACP case, the scaling is followed by the adjustment formulas. Subsequently, the 3D coordinates (X, Y, Z) are derived using the position (u', v') and the face index f (see Table 1 below).

TABLE 1

(X, Y, Z) derivation given (u, v) and the face index f

| f | X | Y | Z |
|---|---|---|---|
| 0 | 1.0 | −v | −u |
| 1 | −1.0 | −v | u |
| 2 | u | 1.0 | v |
| 3 | u | −1.0 | −v |
| 4 | u | −v | 1.0 |
| 5 | −u | −v | −1.0 |

In case of 3D-to-2D coordinate conversion, given (X, Y, Z), the (u, v) and face index f is calculated per Table 2 below. Subsequently, the (u, v) coordinates are divided by the padfactor. In the ACP case, the scaling is performed after the adjustment formulas.

TABLE 2

Derivation of (u, v) and the face index f given (X, Y, Z)

| Condition | f | u | v |
|---|---|---|---|
| |X| ≥ |Y| and |X| ≥ |Z| and X > 0 | 0 | −Z/|X| | −Y/|X| |
| |X| ≥ |Y| and |X| ≥ |Z| and X < 0 | 1 | Z/|X| | −Y/|X| |
| |Y| ≥ |X| and |Y| ≥ |Z| and Y > 0 | 2 | X/|Y| | Z/|Y| |
| |Y| ≥ |X| and |Y| ≥ |Z| and Y < 0 | 3 | X/|Y| | −Z/|Y| |
| |Z| ≥ |X| and |Z| ≥ |X| and Z > 0 | 4 | X/|Z| | −Y/|Z| |
| |Z| ≥ |X| and |Z| ≥ |Y| and Z < 0 | 5 | −X/|Z| | −Y/|Z| |

For the asymmetrical guard band case depicted in FIG. 4B, where guard bands (454-469) are added around the top (413-315 together) and bottom (422-424 together) picture halves, scaling in Table 3 is applied per cube face f with asymmetrical apadfactor defined as follows:

$$\text{apadfactor} = \frac{A}{A - \text{padmargin}}$$

TABLE 3

Scaling of (u, v) coordinates in 2D-to-3D conversion of CMP and ACP.

| Face | Index f | 2D-to-3D Conversion |
|---|---|---|
| Front | 0 | u' = u<br>v' = v × padfactor |
| Back | 1 | u' = u × padfactor<br>v' = v |
| Top | 2 | u' = (u + 1) × apadfactor − 1<br>v' = v × padfactor |
| Bottom | 3 | u' = (u + 1) × apadfactor − 1<br>v' = v × padfactor |
| Left | 4 | u' = (u − 1) × apadfactor + 1<br>v' = v × padfactor |
| Right | 5 | u' = (u + 1) × apadfactor − 1<br>v' = v × padfactor |

In case of 3D-to-2D coordinate conversion, the scaling in Table 4 is applied to obtain the final (u', v') coordinates.

TABLE 4

Scaling of (u, v) coordinates in 3D-to-2D conversion of CMP and ACP.

| Face | Index f | 3D-to-2D Conversion |
|---|---|---|
| Front | 0 | u' = u<br>v' = v/padfactor |
| Back | 1 | u' = u/padfactor<br>v' = v |
| Top | 2 | u' = (u + 1)/apadfactor − 1<br>v' = v/padfactor |
| Bottom | 3 | u' = (u + 1)/apadfactor − 1<br>v' = v/padfactor |
| Left | 4 | u' = (u − 1)/apadfactor + 1<br>v' = v/padfactor |
| Right | 5 | u' = (u + 1)/apadfactor − 1<br>v' = v/padfactor |

For the asymmetrical guard band case depicted in FIG. 4C, where guard bands (470-475) are added to the middle picture boundary only, Table 3 is replaced with Table 5 below and Table 4 is replaced with Table 6 below.

TABLE 5

Scaling of (u, v) coordinates in 2D-to-3D conversion of CMP and ACP.

| Face | Index f | 2D-to-3D Conversion |
|---|---|---|
| Front | 0 | u' = u |
|  |  | v' = (v + 1) × apadfactor − 1 |
| Back | 1 | u' = (u − 1) × apadfactor + 1 |
|  |  | v' = v |
| Top | 2 | u' = u |
|  |  | v' = (v − 1) × apadfactor + 1 |
| Bottom | 3 | u' = u |
|  |  | v' = (v + 1) × apadfactor − 1 |
| Left | 4 | u' = u |
|  |  | v' = (v + 1) × apadfactor − 1 |
| Right | 5 | u' = u |
|  |  | v' = (v + 1) × apadfactor − 1 |

TABLE 6

Scaling of (u, v) coordinates in 3D-to-2D conversion of CMP and ACP.

| Face | Index f | 3D-to-2D Conversion |
|---|---|---|
| Front | 0 | u' = u |
|  |  | v' = (v + 1)/apadfactor − 1 |
| Back | 1 | u' = (u − 1)/apadfactor + 1 |
|  |  | v' = v |
| Top | 2 | u' = u |
|  |  | v' = (v − 1)/apadfactor + 1 |
| Bottom | 3 | u' = u |
|  |  | v' = (v + 1)/apadfactor − 1 |
| Left | 4 | u' = u |
|  |  | v' = (v + 1)/apadfactor − 1 |
| Right | 5 | u' = u |
|  |  | v' = (v + 1)/apadfactor − 1 |

Scaling is applied for ECP with padfactor and apadfactor defined for CMP and ACP.

In the asymmetric guard band case of FIG. 5B, where guard bands (550-565) are applied to the upper (511) and lower picture (519-521 together) halves, the following scaling in Table 7 and Table 8 is applied.

TABLE 7

Scaling of (u, v) coordinates in 2D-to-3D conversion of ECP.

| Index f | 2D-to-3D Conversion |
|---|---|
| 0 | u' = u × padfactor |
|  | v' = (v + 1) × apadfactor − 1 |
| 1 | u' = u × padfactor |
|  | v' = (v − 1) × apadfactor + 1 |
| 2 | u' = (u − 1) × apadfactor + 1 |
|  | v' = v × padfactor |
| 3 | u' = u |
|  | v' = v × padfactor |
| 4 | u' = (u + 1) × apadfactor − 1 |
|  | v' = v × padfactor |
| 5 | u' = u × padfactor |
|  | v' = v |

TABLE 8

Scaling of (u, v) coordinates in 3D-to-2D conversion of ECP.

| Index f | 3D-to-2D Conversion |
|---|---|
| 0 | u' = u/padfactor |
|  | v' = (v + 1)/apadfactor − 1 |

TABLE 8-continued

Scaling of (u, v) coordinates in 3D-to-2D conversion of ECP.

| Index f | 3D-to-2D Conversion |
|---|---|
| 1 | u' = u/padfactor |
|  | v' = (v − 1)/apadfactor + 1 |
| 2 | u' = (u − 1)/apadfactor + 1 |
|  | v' = v/padfactor |
| 3 | u' = u |
|  | v' = v/padfactor |
| 4 | u' = (u + 1)/apadfactor − 1 |
|  | v' = v/padfactor |
| 5 | u' = u/padfactor |
|  | v' = v |

The following are further detailed examples of the video encoder-only modifications exemplary approach including a $1^{st}$ example titled quantization parameter adjustment, a $2^{nd}$ example titled in-loop filter disabling, and a $3^{rd}$ example titled preventing predictions from non-adjacent regions. Such examples are video coding standard compliant with at least HEVC, and may be compliant with other standards having functionality applicable or analogous to the functionality addressed here.

Figure 6:
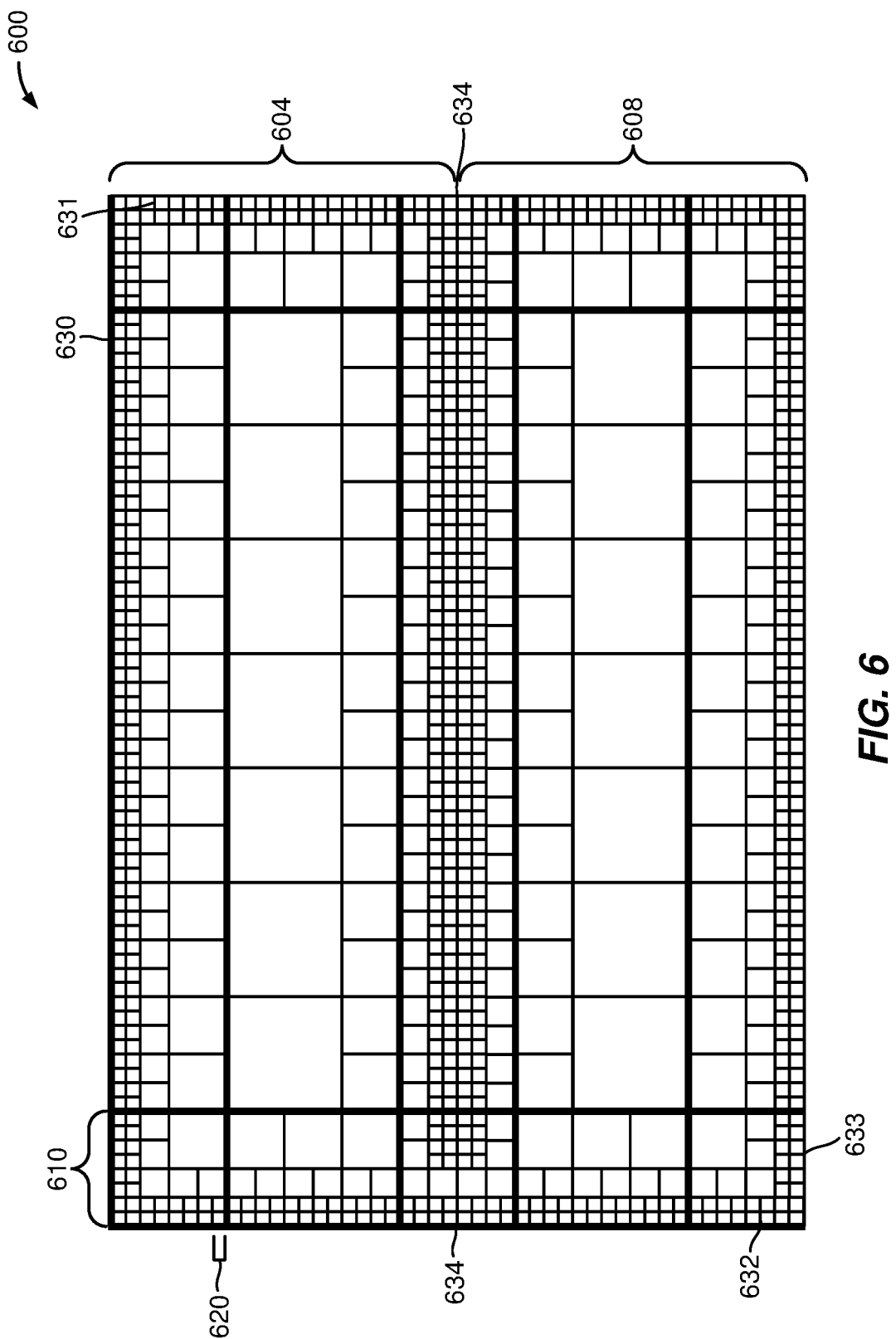
FIG. 6 is a diagram illustrating an example of CTU splitting down to 8×8 CUs along the upper and lower picture halves, in accordance with some examples.

FIG. 6 shows a picture 600 an upper picture half 604 and lower picture half 608. Picture 600 is also shown with an exemplary 64×64 coding tree unit (CTU) and an exemplary 8×8 coding unit (CU). One CTU side 610 of the exemplary CTU is shown, as well as one 8×8 CU side 620 of exemplary CU. The picture 600 has four outer edge picture boundaries 630-633 at its perimeters, four upper picture region boundaries 630, 631, 632, 634 about the perimeter of the upper picture half 604, and four lower picture region boundaries 631, 632, 633, 634 about the perimeter of the lower picture half 608.

The quantization parameter (QP) adjustment along projected picture regions exemplary approach can contain the following functionality. The QP value may be adjusted along the projected picture region boundaries of CMP, ACP, or ECP. Additionally, the QP value may be adjusted for a set of CUs with the first CU adjacent to the projected picture region boundary and at least one other CU adjacent to the first CU or another CU in the set but not adjacent to the projected picture region boundary. The region QP area boundaries where QP is adjusted may resemble the guard band regions as discussed above, i.e., symmetric or asymmetric, with the difference being that the width of the QP area boundary depends on the coding unit size that allows for the QP change through delta-QP coding, if a residual is present (e.g., HEVC). The coding unit size for QP adjustment may be as large as the CTU or as small as the 8×8 CU, or any CU size combination therebetween. Note that the QP adjustment typically does not add projected samples to the projected picture, however, QP adjustment may be combined with the guard band approach. FIG. 6 illustrates CTU splitting of a picture 600 down to 8×8 CUs along the upper and lower picture halves. The idea is to reduce the QP value of the 8×8 CUs along the boundaries. Such an approach would increase the number of bits assigned to the boundaries, hence, increasing the quality of the boundaries and reducing the seam/boundary artifacts in the rendered viewport.

The QP adjustment may be applied to all picture types such as intra coded, P (predictive coded picture) or B (bidirectional predictive coded picture) pictures generated in the random-access (RA) configuration of the video encoder, for example. Alternatively, the QP adjustment may be limited to intra-coded pictures only, or limited to certain levels of the picture prediction hierarchy in the RA configuration, for example, only intra coded pictures and first level B pictures. The QP adjustment may also be dependent on the QP value of the picture, for example. In case of a low (below a threshold value (e.g., less than 20)) QP value, the QP adjustment may be avoided or reduced.

The in-loop filter (deblocking, sample adaptive offset, etc.) disabling with tiles, slices, or QP changes exemplary approach can contain the following functionality. In at least one example, in the 3×2 packing of the CMP, ACP, or ECP projected picture, the in-loop filtering may affect the boundary between the upper and lower picture halves, resulting in severe seam/boundary artifacts in the rendered viewport. The in-loop filtering may be disabled on certain edges under the following five scenarios: In a $1^{st}$ scenario, disable in-loop filtering (deblocking, SAO) in the entire picture by disabling in-loop filtering in the parameter sets (sequence parameter set (SPS), picture parameter set (PPS), etc.). In a $2^{nd}$ scenario, disable in-loop filtering within a slice. In an example, one slice may consist of the CTUs containing the boundary. In-loop filtering may be disabled in the slice header. In a $3^{rd}$ scenario, disable in-loop filtering across the tile boundary. In one example, two tiles may be defined containing the CTUs (or two CUs separated across the middle boundary, where the middle boundary may not be CTU aligned but the tile height is an integer multiple of the CTUs) in the upper and lower picture halves, respectively. In a $4^{th}$ scenario, disable in-loop filtering by reducing the QP value of CUs along the boundary. If the QP is reduced below a threshold value (e.g., 15) then the deblocking filter does not affect edge samples. In a $5^{th}$ scenario, the encoder can disable in-loop filtering by choosing not to apply a sample adaptive offset (SAO) band or edge offsets to CTUs along the boundary.

The preventing frame predictions from non-adjacent regions (intra prediction, motion compensation prediction (inter prediction), etc.) exemplary approach can contain the following functionality. Since intra prediction utilizes neighboring samples, which are potentially located in non-adjacent regions in the projected picture, a goal would be to prevent the encoder from utilizing these samples. Especially at higher QP value levels, artifacts may be visible. One approach to prevent the encoder from utilizing the neighboring samples is to define tiles with boundaries between non-adjacent regions in the projected picture. Preventing motion compensation (inter prediction) from non-adjacent regions can be accomplished by restricting the search area of the motion estimation process in the encoder.

The video data captured by a camera (e.g., a fisheye camera, or other suitable camera or cameras) can be coded to reduce the amount of data needed for transmission and storage. Coding techniques may be implemented in an example video encoding and decoding system. In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if the video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 7:
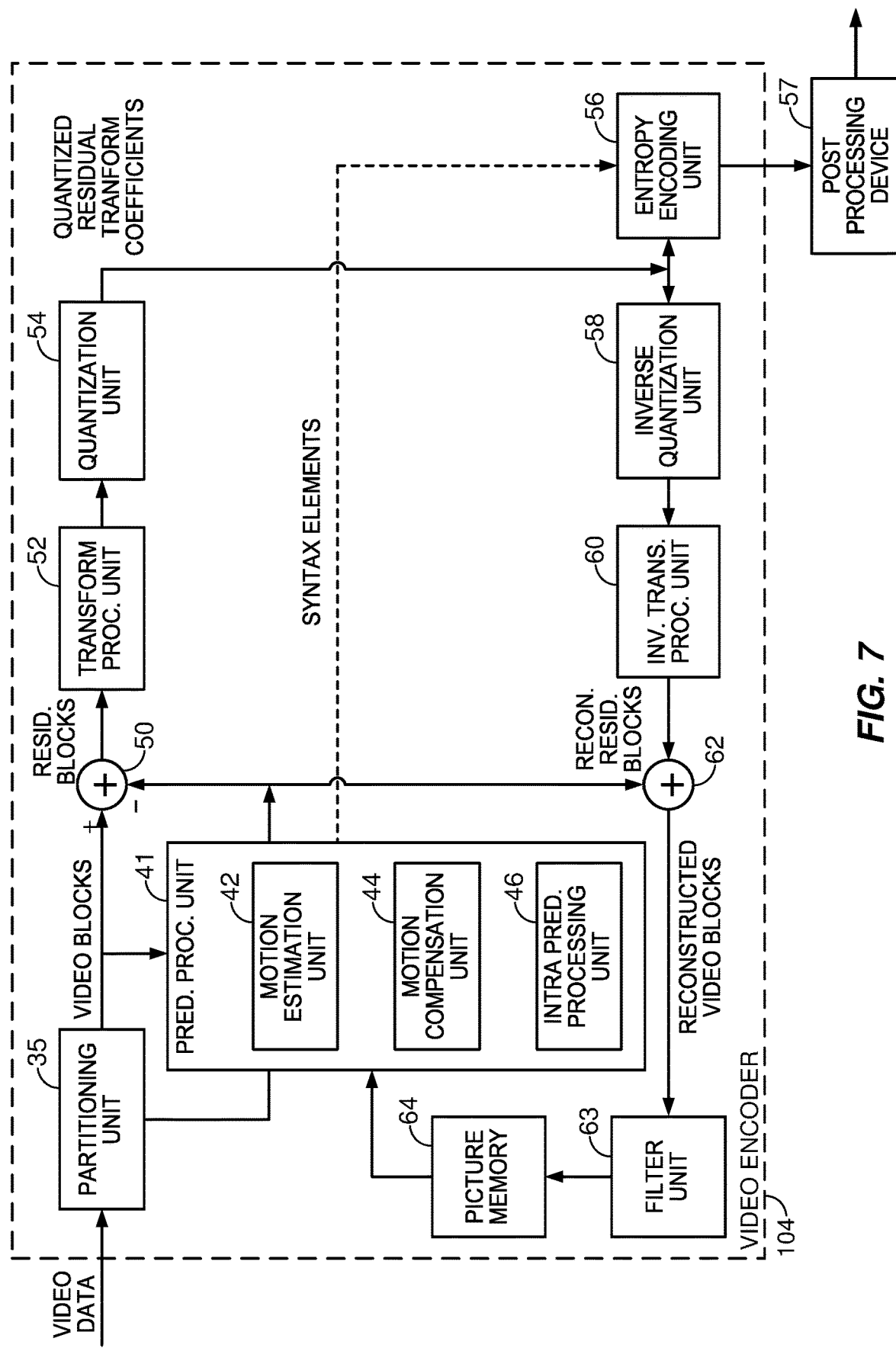
FIG. 7 is a block diagram illustrating an example video encoding device, in accordance with some examples.
Figure 8:
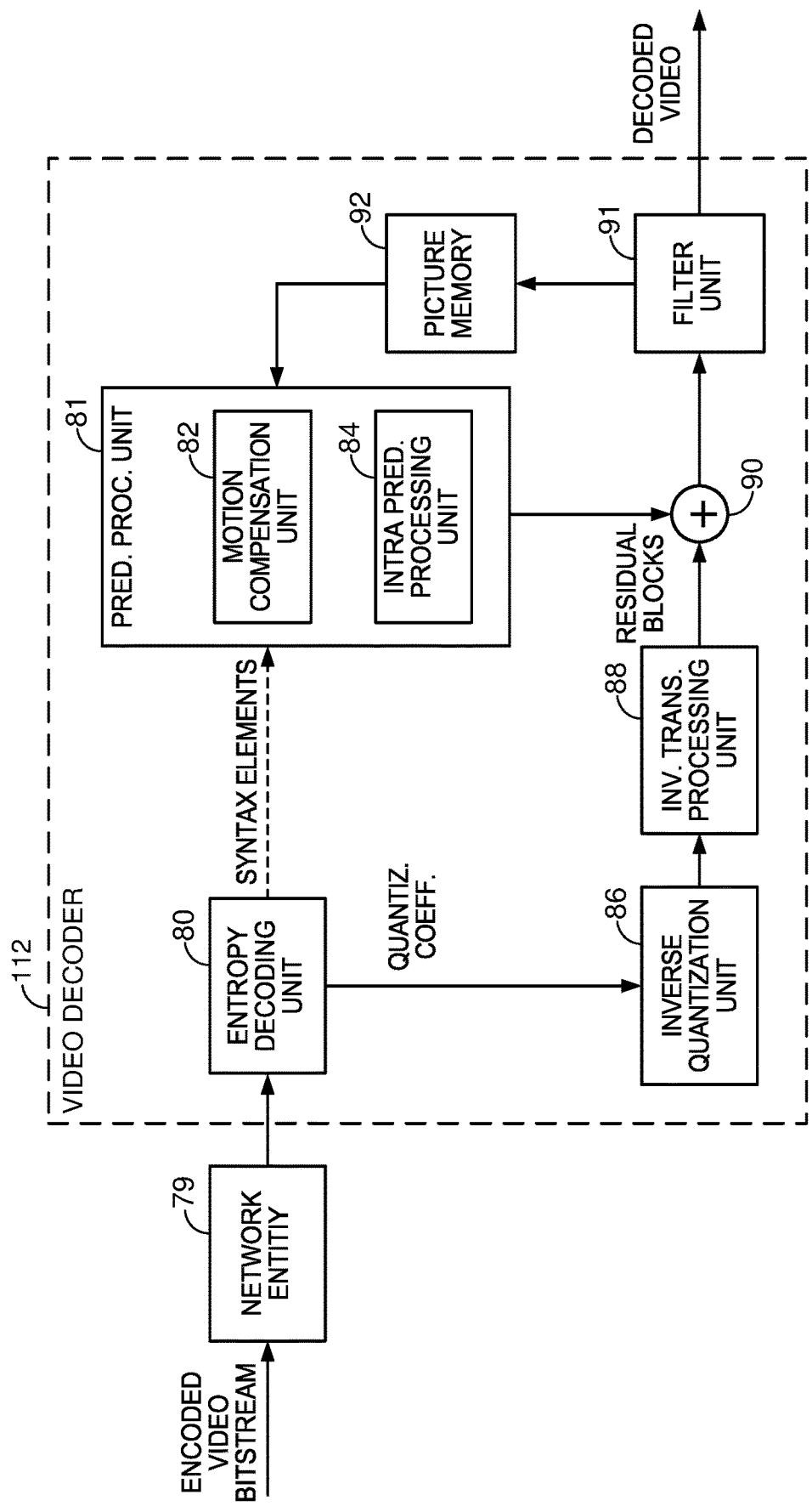
FIG. 8 is a block diagram illustrating an example video decoding device, in accordance with some examples.

Specific details of an example encoding device 104 and decoding device 112 are shown in FIG. 7 and FIG. 8, respectively. FIG. 7 is a block diagram illustrating an example encoding device 104 that may implement one or more of the techniques described in this disclosure. Encoding device 104 may, for example, generate the syntax structures described herein (e.g., the syntax structures of a video parameter set (VPS), sequence parameter set (SPS), picture parameter set (PPS), or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 7, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 7 represents an example of a video encoder configured to generate syntax for an encoded video bitstream. The encoding device 104 may, for example, generate VPS, SPS, and PPS parameter sets as described above. The encoding device 104 may perform any of the techniques described herein, including the processes described above. The techniques of this disclosure have generally been described with respect to the encoding device 104, but as mentioned above, some of the techniques of this disclosure may also be implemented by post processing device 57.

FIG. 8 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 7.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in one or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 8 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as a video destination device 122.

Figure 9:
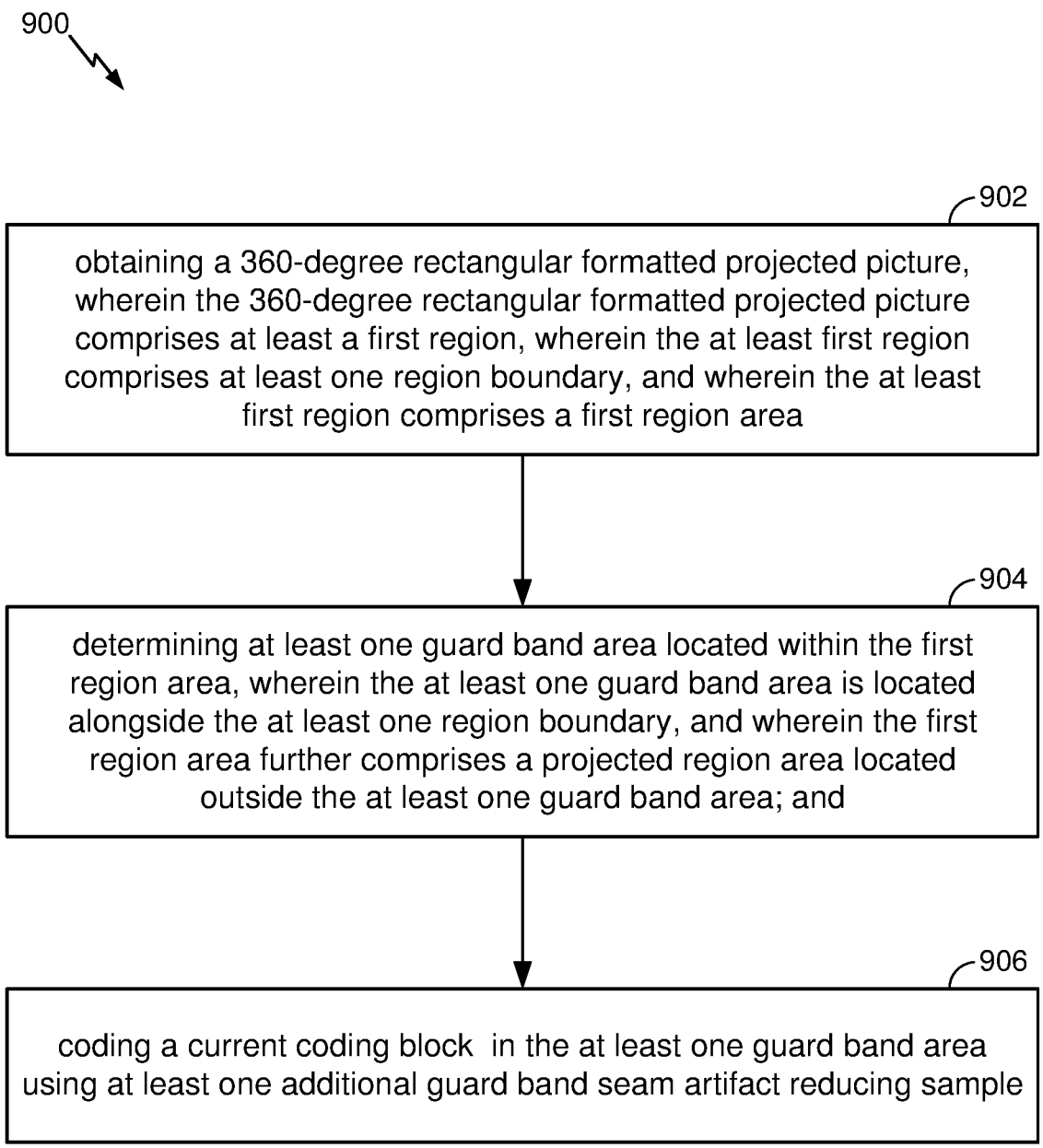
FIG. 9 is a flowchart illustrating an example of a process for processing video data according to the techniques discussed herein.

FIG. 9 illustrates an example of a process 900 for processing video data according to the techniques discussed above. At 902, the process 900 includes obtaining a 360-degree rectangular formatted projected picture, wherein the 360-degree rectangular formatted projected picture comprises at least a first region, wherein the at least first region comprises at least one region boundary, and wherein the at least first region comprises a first region area.

At 904, the process 900 includes determining at least one guard band area located within the first region area, wherein the at least one guard band area is located alongside the at least one region boundary, and wherein the first region area further comprises a projected region area located outside the at least one guard band area.

At 906, the process 900 includes coding a current coding block in the at least one guard band area using at least one additional guard band seam artifact reducing sample.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data at a video coder, comprising:

obtaining a 360-degree rectangular formatted projected picture, wherein the 360-degree rectangular formatted projected picture comprises a plurality of regions, wherein a first region of the plurality of regions comprises at least one first region boundary and a first region area and a second region of the plurality of regions comprises at least one second region boundary and a second region area;

determining at least one first guard band area located within the first region area, wherein the at least one first guard band area is located alongside the at least one first region boundary, and wherein the first region area further comprises a first projected region area located outside the at least one first guard band area;

determining at least one second guard band area located within the second region area, wherein the at least one second guard band area is symmetrical to the first guard band area; and coding a current coding block in the at least one first guard band area using at least one additional guard band sample.

2. The method of claim 1, further comprising:

identifying the at least one additional guard band sample located within the current coding block.

3. The method of claim 2, wherein identifying the at least one additional guard band sample located within the current coding block further comprises determining that the at least one additional guard band sample is located in the second region.

4. The method of claim 3, wherein the determining that the at least one additional guard band sample is located in the second region is performed using 3D-to-2D geometric mapping.

5. The method of claim 4, wherein the 3D-to-2D geometric mapping is one of:

a cubemap (CMP) process, an adjusted cubemap (ACP) process, and an equatorial cylindrical (ECP) process.

6. The method of claim 2, wherein the at least one additional guard band sample is identified as located in a non-guard band area.

7. The method of claim 1, wherein coding the current coding block in the at least one first guard band area using the at least one additional guard band sample further comprises: performing a gradient operation that transitions from the first region to the second region using the at least one additional guard band sample.

8. The method of claim 1, wherein coding the current coding block in the at least one first guard band area using the at least one additional guard band sample further comprises: performing blending operations using the at least one additional guard band sample.

9. The method of claim 1, wherein the at least one additional guard band sample is a gradient sample that transitions between the first region to the second region.

10. The method of claim 1, further comprising applying interpolation filters across both the current coding block and the at least one additional guard band sample.

11. The method of claim 1, further comprising performing motion estimation using the at least one additional guard band sample.

12. The method of claim 1, wherein the at least one additional guard band sample is a duplicate sample from the first projected region area.

13. The method of claim 1, wherein the first region area comprises at least one coding tree unit (CTU), wherein the CTU comprises at least one CTU boundary, and wherein the at least one CTU boundary is located along the at least one first region boundary.

14. A device comprising a video coder for processing video data, further comprising:

a memory; and a processor configured to perform a method comprising:

obtaining a 360-degree rectangular formatted projected picture, wherein the 360-degree rectangular formatted projected picture comprises a plurality of regions, wherein the at least a first region of the plurality of regions comprises at least one first region boundary and a first region area and a second region of the plurality of regions comprises at least one second region boundary and a second region area;

determining at least one first guard band area located within the first region area, wherein the at least one first guard band area is located alongside the at least one first region boundary, and wherein the first region area further comprises a first projected region area located outside the at least one first guard band area; and coding a current coding block in the at least one first guard band area using at least one additional guard band sample.

15. The device of claim 14, the method further comprising:

identifying the at least one additional guard band sample located within the current coding block.

16. The device of claim 15, wherein identifying the at least one additional guard band sample located within the current coding block further comprises determining that the at least one additional guard band sample is located in the second region.

17. The device of claim 16, wherein the determining that the at least one additional guard band sample is located in the second region is performed using 3D-to-2D geometric mapping.

18. The device of claim 17, wherein the 3D-to-2D geometric mapping is one of:

a cubemap (CMP) process, an adjusted cubemap (ACP) process, and an equatorial cylindrical (ECP) process.

19. The device of claim 15, wherein the at least one additional guard band sample is identified as located in a non-guard band area.

20. The device of claim 14, wherein coding the current coding block in the at least one first guard band area using the at least one additional guard band sample further comprises: performing a gradient operation that transitions from the first region to the second region using the at least one additional guard band sample.

21. The device of claim 14, wherein coding the current coding block in the at least one first guard band area using the at least one additional guard band sample further comprises: performing blending operations using the at least one additional guard band sample.

22. The device of claim 14, wherein the at least one additional guard band sample is a gradient sample that transitions between the first region to the second region.

23. The device of claim 14, the method further comprising applying interpolation filters across both the current coding block and the at least one additional guard band sample.

24. The device of claim 14, the method further comprising performing motion estimation using the at least one additional guard band sample.

25. The device of claim 14, wherein the at least one additional guard band sample is a duplicate sample from the first projected region area.

26. The device of claim 14, wherein the first region area comprises at least one coding tree unit (CTU), wherein the CTU comprises at least one CTU boundary, and wherein the at least one CTU boundary is located along the at least one first region boundary.

27. A non-transitory computer-readable medium for processing video data at a video coder, the non-transitory computer-readable medium storing a program containing instructions that, when executed by a processor of a device, cause the device to perform a method comprising:

obtaining a 360-degree rectangular formatted projected picture, wherein the 360-degree rectangular formatted projected picture comprises a plurality of regions, wherein a first region of the plurality of regions comprises at least one first region boundary and a first region area and a second region of the plurality of regions comprises at least one second region boundary and a second region area;

determining at least one first guard band area located within the first region area, wherein the at least one first guard band area is located alongside the at least one first region boundary, and wherein the first region area further comprises a first projected region area located outside the at least one first guard band area; and coding a current coding block in the at least one first guard band area using at least one additional guard band sample.

28. The non-transitory computer-readable medium of claim 27, the method further comprising:
identifying the at least one additional guard band sample located within the current coding block.

29. The non-transitory computer-readable medium of claim 28, wherein identifying the at least one additional guard band sample located within the current coding block further comprises determining that the at least one additional guard band sample is located in the second region.

30. The non-transitory computer-readable medium of claim 29, wherein the determining that the at least one additional guard band sample is located in the second region is performed using 3D-to-2D geometric mapping.

31. The non-transitory computer-readable medium of claim 30, wherein the 3D-to-2D geometric mapping is one of:
a cubemap (CMP) process, an adjusted cubemap (ACP) process, and an equatorial cylindrical (ECP) process.

32. The non-transitory computer-readable medium of claim 28, wherein the at least one additional guard band sample is identified as located in a non-guard band area.

33. The non-transitory computer-readable medium of claim 27, wherein coding the current coding block in the at least one first guard band area using the at least one additional guard band sample further comprises: performing a gradient operation that transitions from the first region to the second region using the at least one additional guard band sample.

34. The non-transitory computer-readable medium of claim 27, wherein coding the current coding block in the at least one first guard band area using the at least one additional guard band sample further comprises: performing blending operations using the at least one additional guard band sample.

35. The non-transitory computer-readable medium of claim 27, wherein the at least one additional guard band sample is a gradient sample that transitions between the first region to the second region.

36. The non-transitory computer-readable medium of claim 27, the method further comprising applying interpolation filters across both the current coding block and the at least one additional guard band sample.

37. The non-transitory computer-readable medium of claim 27, wherein the at least one additional guard band sample is a duplicate sample from the first projected region area.

38. The method of claim 1, wherein a third region of the plurality of regions comprises at least one third region boundary and a third region area, the method further comprising determining at least one third guard band area located within the third region area, wherein the at least one third guard band area is asymmetrical to the first guard band area.

39. The device of claim 14, wherein a third region of the plurality of regions comprises at least one third region boundary and a third region area, the method further comprising determining at least one third guard band area located within the third region area, wherein the at least one third guard band area is asymmetrical to the first guard band area.

* * * * *